US011893619B2

(12) United States Patent
Tanaka

(10) Patent No.: US 11,893,619 B2
(45) Date of Patent: Feb. 6, 2024

(54) FLOWERBED SALES ORDER SYSTEM, FLOWERBED SALES ORDER PROGRAM, AND FLOWERBED SALES ORDER METHOD

(71) Applicant: Suiko Tanaka, Miyagi (JP)

(72) Inventor: Suiko Tanaka, Miyagi (JP)

(*) Notice: Subject to any disclaimer, the term of this patent is extended or adjusted under 35 U.S.C. 154(b) by 0 days.

(21) Appl. No.: 17/893,923

(22) Filed: Aug. 23, 2022

(65) Prior Publication Data

US 2022/0405825 A1    Dec. 22, 2022

Related U.S. Application Data

(63) Continuation of application No. 16/638,637, filed as application No. PCT/JP2018/028313 on Jul. 27, 2018, now Pat. No. 11,461,823.

(30) Foreign Application Priority Data

Aug. 16, 2017    (JP) ................... 2017-157253

(51) Int. Cl.
     *G06Q 30/06*      (2023.01)
     *G06Q 30/0601*      (2023.01)
     (Continued)

(52) U.S. Cl.
     CPC ......... *G06Q 30/0631* (2013.01); *G06F 16/22* (2019.01); *G06F 16/9535* (2019.01);
     (Continued)

(58) Field of Classification Search
     CPC ........... G06Q 30/0631; G06Q 30/0643; G06Q 30/0633; G06Q 30/0282; G06F 16/9535
     (Continued)

(56) References Cited

U.S. PATENT DOCUMENTS 7,945,484 B1    5/2011    Tam et al.
8,484,071 B1 *    7/2013    Lybrook ............ G06Q 30/0282
                                                 705/7.36
(Continued)

FOREIGN PATENT DOCUMENTS

EP      1110586 A2 *    6/2001    ............. A63F 13/12
JP      2002-117243 A      4/2002
(Continued)

OTHER PUBLICATIONS

Article, "Mother Nature Meets Motherboard"; published in PR Newswire [New York] Mar. 16, 2000 retrieved from Dialog on May 18, 2023 (Year: 2000).*

(Continued)

*Primary Examiner* — Yogesh C Garg
(74) *Attorney, Agent, or Firm* — GREENBLUM & BERNSTEIN, P.L.C.

(57) ABSTRACT

An object of the present invention is to provide a flowerbed sales order system, which enables a user to order a flowerbed with a simple method without having the user design the flowerbed from scratch. The present invention relates to a flowerbed sales order system comprising a user terminal and a server apparatus capable of communicating with the user terminal, the system comprising: a flowerbed storage that stores information regarding flowerbeds; a flowerbed recommendation displayer that recommends and displays a flowerbed based on a prescribed condition; an order placement request transmitter that transmits an order placement request of the recommended and displayed flowerbed; and an order placement request receiver that receives the order placement request.

11 Claims, 25 Drawing Sheets

(51) Int. Cl.
*G06F 16/22* (2019.01)
*G06F 16/9535* (2019.01)
*G06Q 30/0282* (2023.01)

(52) U.S. Cl.
CPC ..... *G06Q 30/0282* (2013.01); *G06Q 30/0633* (2013.01); *G06Q 30/0643* (2013.01); *G06Q 30/0621* (2013.01)

(58) Field of Classification Search
USPC ........................................................ 705/26.7
See application file for complete search history.

(56) References Cited

U.S. PATENT DOCUMENTS

| | | | |
|---|---|---|---|
| 9,501,588 | B1 | 11/2016 | Rowe et al. |
| 2008/0077846 | A1* | 3/2008 | Sako ................ G06Q 10/10 715/227 |
| 2009/0216661 | A1 | 8/2009 | Warner |
| 2011/0054921 | A1 | 3/2011 | Lynds |
| 2011/0071919 | A1 | 3/2011 | Spry |
| 2012/0273441 | A1 | 11/2012 | Mullaney |
| 2012/0310744 | A1* | 12/2012 | Kim ................ G06Q 30/02 705/14.65 |
| 2013/0063384 | A1* | 3/2013 | Ito ................ G06F 3/0485 345/173 |
| 2014/0279181 | A1 | 9/2014 | Wills |
| 2016/0085816 | A1 | 3/2016 | Sakai et al. |

FOREIGN PATENT DOCUMENTS

| | | | |
|---|---|---|---|
| JP | 2002117243 A | * | 4/2002 |
| JP | 2003-099655 A | | 4/2003 |
| JP | 2008-139928 A | | 6/2008 |
| JP | 2009-252152 A | | 10/2009 |
| JP | 2014-174781 A | | 9/2014 |
| JP | 2016-062511 A | | 4/2016 |

OTHER PUBLICATIONS

Nov. 27, 2020 Extended European Search Report in European Application No. 18847025.6.

Fabiani Giannetto, Raffaella, "The Medici gardens of fifteenth-century Florence: Conceptualization and Tradition" a ProQuest Dissertations and Theses published in Proquest Dissertations Publishing in the year 2004, retrieved from Dialog database on Jun. 6, 2022.

International Search Report issued in International Patent Application No. PCT/JP2018/028313, dated Sep. 18, 2018.

Written opinion of the International Searching Authority issued in International Application No. PCT/JP2018/028313, dated Sep. 18, 2018.

* cited by examiner

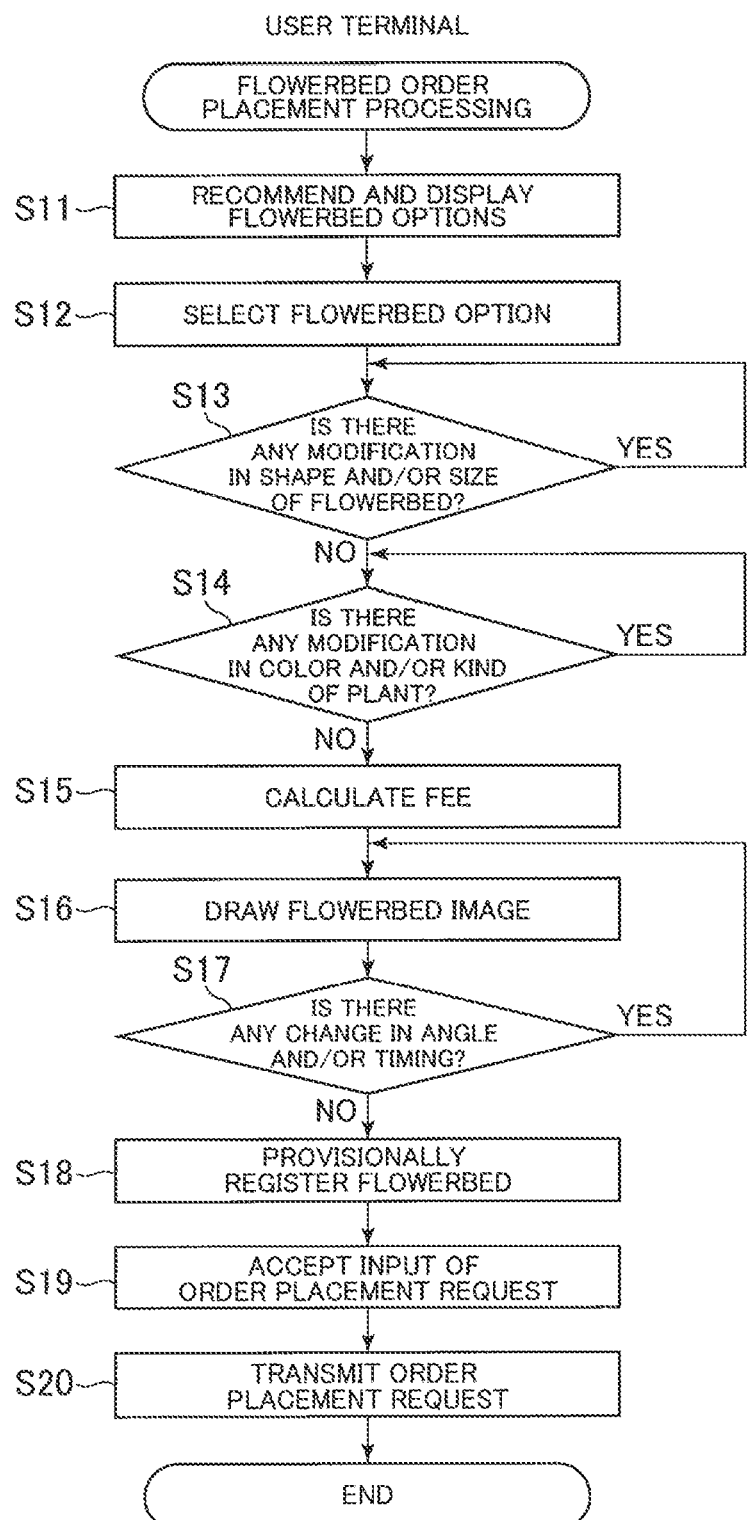

FIG.8

| PLANT | COLOR | PLANTING TIMING | APPRECIATION TIMING | PHOTO DATA |
|---|---|---|---|---|
| HYDRANGEA | BLUE | MARCH | JULY | DATA ID 0001 |
| | PURPLE | MARCH | JULY | DATA ID 0002 |
| | RED | MARCH | JULY | DATA ID 0003 |
| | PINK | MARCH | JULY | DATA ID 0004 |
| | WHITE | MARCH | JULY | DATA ID 0005 |
| CARNATION | RED | APRIL TO JUNE, SEPTEMBER, OCTOBER | SEPTEMBER, OCTOBER, APRIL TO JUNE | DATA ID 0006 |
| | BLUE | APRIL TO JUNE, SEPTEMBER, OCTOBER | SEPTEMBER, OCTOBER, APRIL TO JUNE | DATA ID 0007 |
| | PURPLE | APRIL TO JUNE, SEPTEMBER, OCTOBER | SEPTEMBER, OCTOBER, APRIL TO JUNE | DATA ID 0008 |
| | PINK | APRIL TO JUNE, SEPTEMBER, OCTOBER | SEPTEMBER, OCTOBER, APRIL TO JUNE | DATA ID 0009 |
| | ORANGE | APRIL TO JUNE, SEPTEMBER, OCTOBER | SEPTEMBER, OCTOBER, APRIL TO JUNE | DATA ID 0010 |

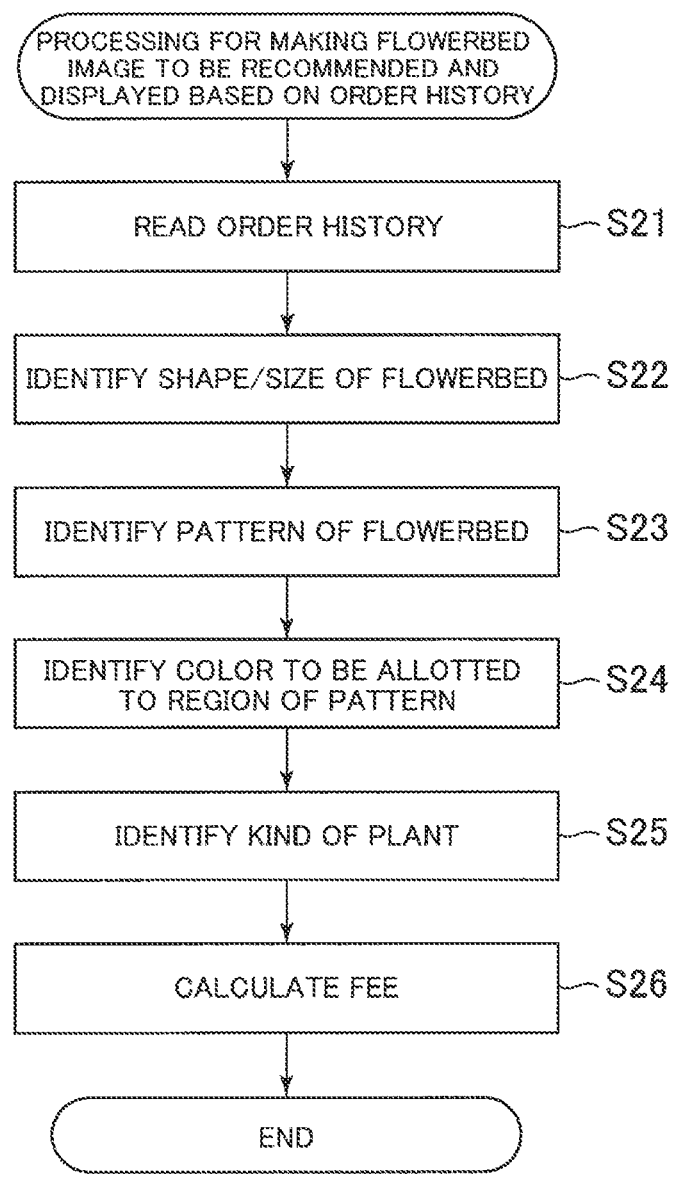

FIG. 11

| USER ID | ORDER HISTORY ID | PLANT NAME | COLOR | PLANTING TIMING | APPRECIATION TIMING | INDIVIDUAL AREA(m²) | FLOWERBED AREA(m²) | SHAPE | PATTERN | FEE (YEN) | IMAGE ID |
|---|---|---|---|---|---|---|---|---|---|---|---|
| P0001 | B0001 | HYDRANGEA | BLUE | MARCH | JULY | 1.7 | 5.1 | RECTANGLE | VERTICAL STRIPES | 76500 | F0001 |
| | | HYDRANGEA | WHITE | MARCH | JULY | 1.7 | | | | | |
| | | HYDRANGEA | RED | MARCH | JULY | 1.7 | | | | | |
| | B0011 | GLADIOLUS | WHITE | MARCH TO JUNE | JULY TO OCTOBER | 1.9 | 3.8 | RECTANGLE | LATERAL STRIPES | 62700 | F0011 |
| | | GOLDEN COSMOS | YELLOW | APRIL TO AUGUST | JULY TO AUGUST | 1.9 | | | | | |
| | B0111 | HIBISCUS | RED | APRIL TO MAY | MAY TO OCTOBER | 1.2 | 1.2 | OVAL | NONE | 21600 | F0111 |

101 102 103 104 105 106 107 108 109 110 111 112 113

ORDER HISTORY

| | | | | | RECOMMENDED FLOWERBED TEMPLATE | | | | | | |
|---|---|---|---|---|---|---|---|---|---|---|---|
| CUSTOMER ID | RECOMMENDATION ID | PLANT NAME | COLOR | PLANTING TIMING | APPRECIATION TIMING | INDIVIDUAL AREA(m²) | FLOWERBED AREA(m²) | SHAPE | PATTERN | FEE (YEN) | IMAGE ID |
| P0001 | R0001 | HYDRANGEA | WHITE | MARCH | JULY | 1.7 | 3.8 | RECTANGLE | VERTICAL STRIPES | 51000 | F0001 |
| | | HYDRANGEA | RED | MARCH | JULY | 1.7 | | | | | |
| | R0023 | HYDRANGEA | WHITE | MARCH | JULY | 1.7 | 3.8 | RECTANGLE | LATERAL STRIPES | 60800 | F0023 |
| | | GOLDEN COSMOS | YELLOW | APRIL TO AUGUST | JULY TO AUGUST | 1.9 | | | | | |
| | R0210 | GLADIOLUS | WHITE | MARCH TO JUNE | JULY TO OCTOBER | 1.9 | 3.8 | RECTANGLE | LATERAL STRIPES | 64800 | F0210 |
| | | HIBISCUS | RED | APRIL TO MAY | MAY TO OCTOBER | 1.9 | | | | | |

121  122  123  124  125  126  127  128  129  130  131  132  133

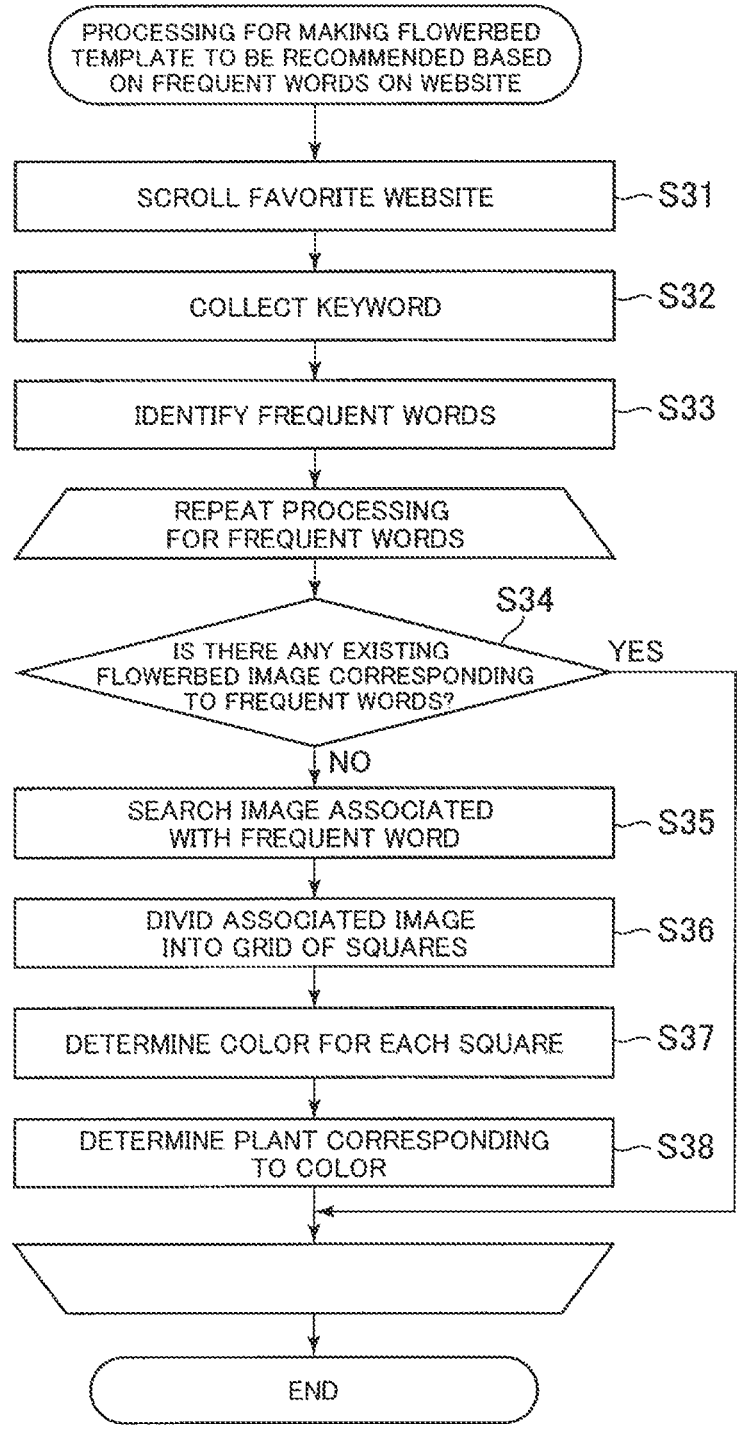

| USER ID | WEBSITE INFORMATION ||| FREQUENT WORD |||
| | WEBSITE ID | WEBSITE NAME | URL | 1st | 2nd | 3rd |
|---|---|---|---|---|---|---|
| P0001 | S0001 | ○○○○○ | http://www... | ITALY | GERMANY | SWITZERLAND |
| | S0002 | △△△△△ | http://www... | CRESCENT MOON | SATURN | SWITZERLAND |
| P0002 | S0003 | ◇◇◇◇◇ | http://www... | BEAR | DUCK | CHICK |
| | S0004 | □□□□□ | http://www... | DOG | CAT | BIRD |

| USER ID | GENDER | AGE | RESIDENCE AREA | BIRTHPLACE | ANNUAL INCOME | OCCUPATION | FLOWERBED IMAGE ID |
|---|---|---|---|---|---|---|---|
| P0001 | FEMALE | 40S | TOHOKU | HOKKAIDO | 7 MILLION YEN LEVEL | COMPANY EMPLOYEE | F0001 |
| P0002 | FEMALE | 50S | KANTO | KYUSYU | 8 MILLION YEN LEVEL | BUSINESS OWNER | F0002 |
| P0003 | MALE | 30S | KANSAI | KANSAI | 6 MILLION YEN LEVEL | SELF-EMPLOYED | F0003 |

*FIG. 18*

| | | HIGHLY RELEVANT INFORMATION | | | |
|---|---|---|---|---|---|
| ATTRIBUTE | ATTRIBUTE ITEM | 1st | | 2nd | |
| | | ORDER ITEM | ORDER INFORMATION | ORDER ITEM | ORDER INFORMATION |
| GENDER | MALE | SHAPE | RECTANGLE | COLOR | WHITE |
| | FEMALE | COLOR | PINK | SHAPE | OVAL |
| AGE | 20S | COLOR | RED | PLANT | ROSE |
| | 30S | SHAPE | RECTANGLE | COLOR | RED |
| | 40S | PLANT | HYDRANGEA | SHAPE | RECTANGLE |
| | ... | ... | ... | ... | ... |
| RESIDENCE AREA | HOKKAIDO | AREA | 5~6m² | APPRECIATION TIMING | JULY |
| | TOHOKU | AREA | 5~6m² | APPRECIATION TIMING | JULY |
| | KANTO | COLOR | WHITE | SHAPE | RECTANGLE |
| | ... | ... | ... | ... | ... |
| BIRTHPLACE | HOKKAIDO | COLOR | WHITE | COLOR | YELLOW |
| | TOHOKU | SHAPE | OVAL | SHAPE | 40,000 YEN LEVEL |
| | KANTO | COLOR | WHITE | SHAPE | RECTANGLE |
| | ... | ... | ... | ... | ... |
| ANNUAL INCOME | 5 MILLION YEN LEVEL | SHAPE | RECTANGLE | COLOR | RED |
| | 6 MILLION YEN LEVEL | FEE | 60,000 YEN LEVEL | PLANT | HYDRANGEA |
| | 7 MILLION YEN LEVEL | COLOR | WHITE | AREA | 4~5m² |
| | ... | ... | ... | ... | ... |
| OCCUPATION | BUSINESS OWNER | COLOR | RED | PLANT | ROSE |
| | SELF-EMPLOYED | FEE | 60,000 YEN LEVEL | PLANT | HYDRANGEA |
| | COMPANY EMPLOYEE | SHAPE | RECTANGLE | COLOR | RED |
| | ... | ... | ... | ... | ... |

| USER ID | FLOWERBED IMAGE ID | DESCRIPTION OF FLOWERBED | GROUP ID | GROUP NAME | USER SELECTION POINT | USER SELECTION POINT MODIFIED VALUE | USER ORDER POINT | USER ORDER POINT MODIFIED VALUE | FLOWERBED TOTAL POINT A | USER TOTAL POINT A | RECOMMENDATION DISPLAY PROBABILITY A |
|---|---|---|---|---|---|---|---|---|---|---|---|
| P0001 | F0001 | ITALIAN FLAG | G0001 | NATIONAL FLAG | 0 | 0 | 10 | 3.3 | 3.3 | 20.0 | 0.17 |
| | | | G0022 | VERTICAL STRIPES | 0 | 0 | 0 | 0 | | | |
| | F0002 | FRENCH FLAG | G0001 | NATIONAL FLAG | 0 | 0 | 10 | 3.3 | 3.3 | | 0.17 |
| | | | G0022 | VERTICAL STRIPES | 0 | 0 | 0 | 0 | | | |
| | F0003 | UNION FLAG | G0001 | NATIONAL FLAG | 0 | 0 | 10 | 3.3 | 5.8 | | 0.29 |
| | | | G0033 | RED COLOR GROUP | 5 | 2.5 | 0 | 0 | | | |
| | F0004 | CRESCENT MOON | G0002 | CELESTIAL BODY | 5 | 2.5 | 0 | 0 | 2.5 | | 0.13 |
| | | | G0036 | YELLOW COLOR GROUP | 0 | 0 | 0 | 0 | | | |
| | F0005 | SUN | G0002 | CELESTIAL BODY | 5 | 2.5 | 0 | 0 | 5.0 | | 0.25 |
| | | | G0033 | RED COLOR GROUP | 5 | 2.5 | 0 | 0 | | | |

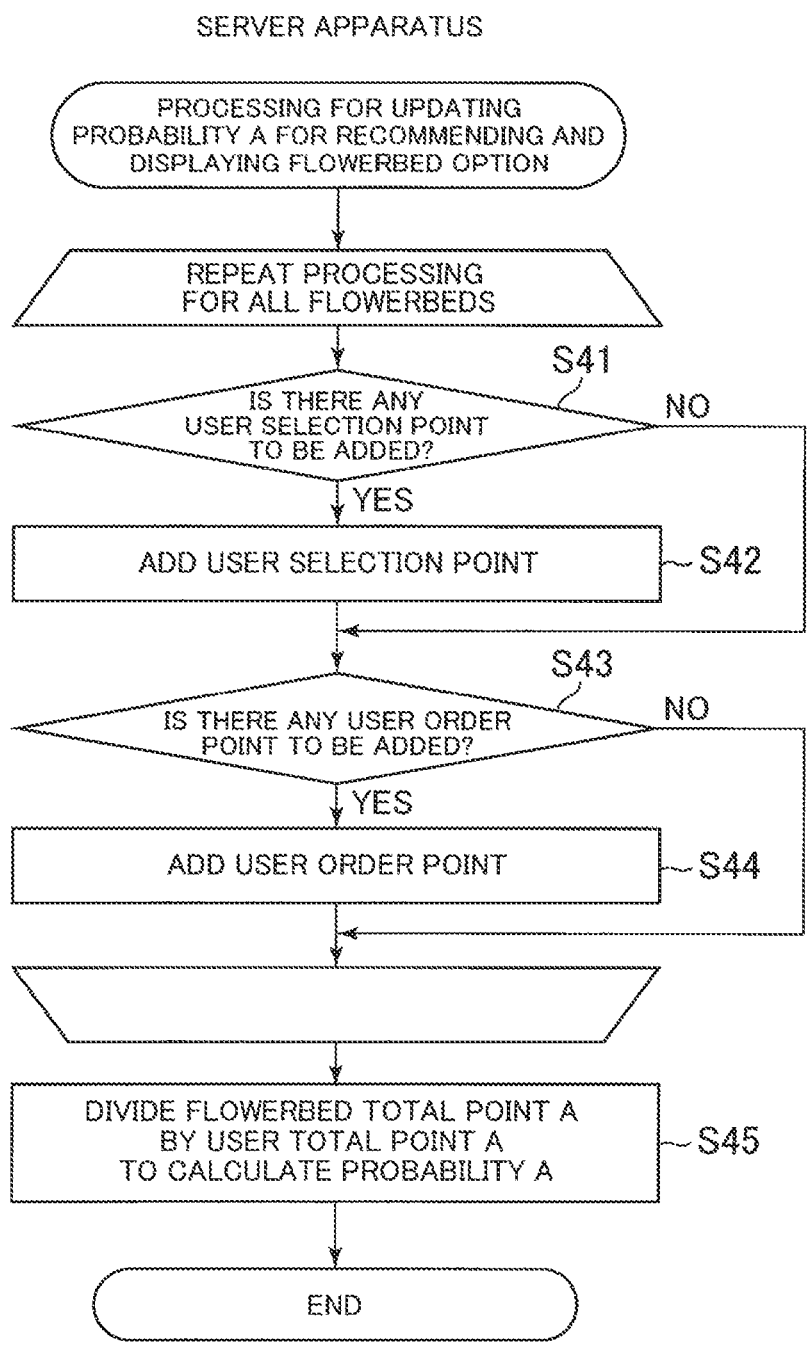

| USER ID 221 | FLOWERBED IMAGE ID 222 | DESCRIPTION OF FLOWERBED 223 | ATTRIBUTE STATISTICS POINT 224 | FREQUENT WORD POINT 225 | VOTING EVALUATION POINT 226 | FLOWERBED TOTAL POINT B 227 | USER TOTAL POINT B 228 | RECOMMENDATION DISPLAY PROBABILITY B 229 |
|---|---|---|---|---|---|---|---|---|
| P0001 | F0001 | ITALIAN FLAG | 1 | 2 | 0 | 3 | 18 | 0.17 |
| | F0002 | FRENCH FLAG | 3 | 1 | 3 | 7 | | 0.39 |
| | F0003 | UNION FLAG | 0 | 3 | 0 | 3 | | 0.17 |
| | F0004 | CRESCENT MOON | 2 | 0 | 2 | 4 | | 0.22 |
| | F0005 | SUN | 0 | 0 | 1 | 1 | | 0.06 |

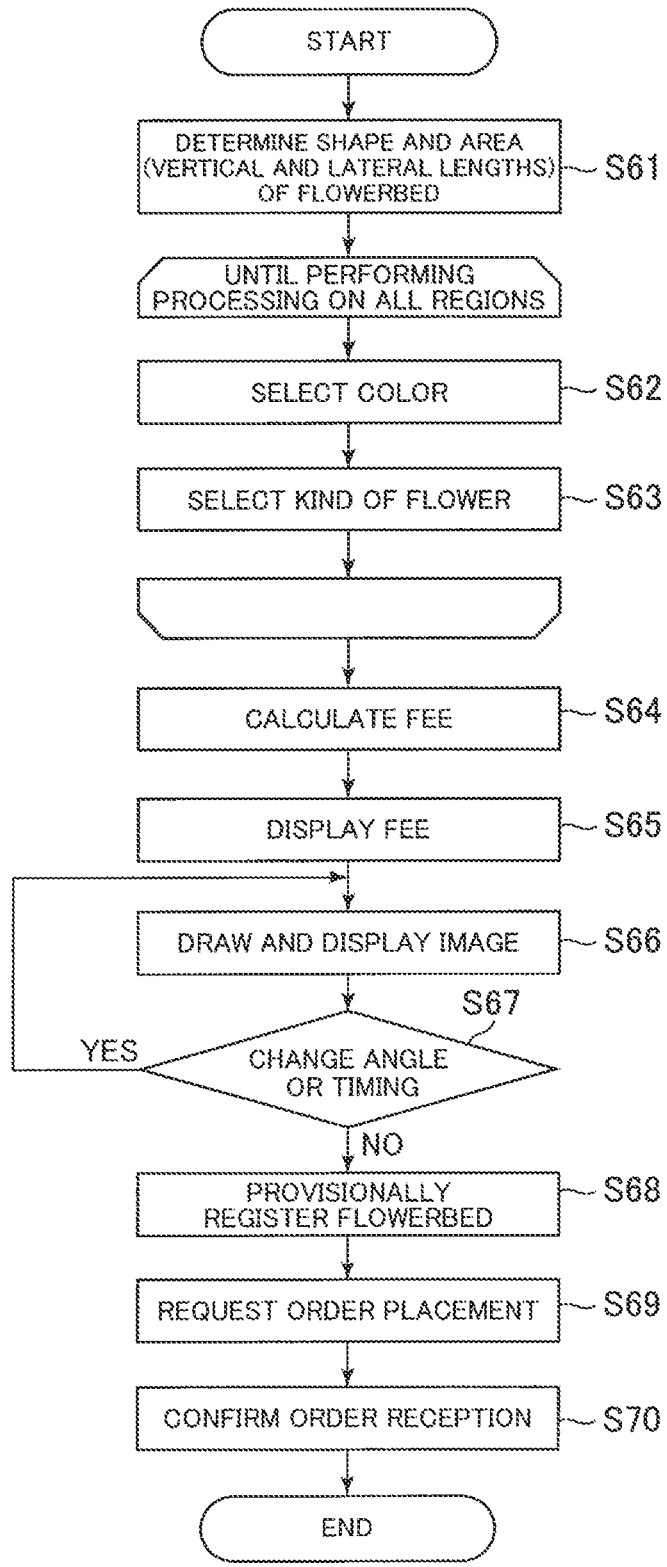

FLOWERBED SALES ORDER SYSTEM, FLOWERBED SALES ORDER PROGRAM, AND FLOWERBED SALES ORDER METHOD

CROSS-REFERENCE TO RELATED APPLICATIONS

This is a continuation application of U.S. patent application Ser. No. 16/638,637 filed Feb. 12, 2020, which is National Stage of International Pat. Appl. No. PCT/JP2018/028313, filed Jul. 27, 2018, and claims the benefit of Japanese Pat. Appl. No. 2017-157253, filed Aug. 16, 2017. The disclosure of each of these documents, including the specification, drawings, and claims thereof, is incorporated herein by reference in its entirety.

The present invention relates to a flowerbed sales order system, a flowerbed sales order program, and a flowerbed sales order method.

BACKGROUND ART

Recently, so-called "gardening", enjoying horticulture in gardens, balconies, and the like, is becoming broadly acknowledged as a general hobby, and there is a need for being able to design a flowerbed freely as desired and to purchase the designed flowerbed with a simple procedure.

Further, it is difficult to know the kinds and the number of plants necessary for making a desired flowerbed and the like unless one has a considerable amount of knowledge regarding gardening, which is an obstacle for those who are inexperienced in gardening when trying to take up gardening.

Further, it is difficult to precisely imagine the complete form at a stage of planning arrangement of plants in a flowerbed and the like, and it tends to happen that the completed form is found to be different from the desired flowerbed and the like after completing the flowerbed and the like by actually planting the plants.

In order to overcome the aforementioned problems, for example, Patent Literature 1 proposes a system that performs design/construction support of a flowerbed by using an information terminal. The system of Patent Literature 1 is disclosed to: include a flowerbed designer that determines the shape of a flowerbed and coloring within the flowerbed by referring to data stored in a database; a condition setter that sets conditions of the designed flowerbed; and a construction supporter that selects necessary materials for constructing the designed flowerbed and makes a construction plan of the flowerbed; and display a three-dimensional schematic view of the flowerbed determined by the flowerbed designer as a perspective view on a user terminal.

CITATION LIST

Patent Literature

Patent Literature 1: JP 2002-117243 A

SUMMARY OF INVENTION

Technical Problem

As described above, even though there are needs for being able to purchase flowerbeds with a simple procedure, there has not been any such system capable of easily placing/receiving sales order of the flowerbeds without having users design the flowerbeds from scratch.

The present invention is designed in view of the aforementioned problems. That is, the object of the present invention is to provide a flowerbed sales order system capable of ordering a flowerbed with a simple method without having a user design the flowerbed from scratch.

Solution to Problem

The present invention is summarized as follows.
[1] A flowerbed sales order system comprising a user terminal and a server apparatus capable of communicating with the user terminal, the system including: a flowerbed information storage that stores information regarding flowerbeds; a flowerbed recommendation displayer that recommends and displays a flowerbed based on a prescribed condition; an order placement request transmitter that transmits an order placement request of the recommended and displayed flowerbed; and an order placement request receiver that receives the order placement request.
[2] The flowerbed sales order system according to [1], including an order history storage that stores the order placement request of the flowerbed made by a user as an order history, wherein the flowerbed recommendation displayer recommends and displays the flowerbed based on the order history.
[3] The flowerbed sales order system according to [1] or [2], including a frequent word identificator that identifies a frequent word on a prescribed website, wherein: the flowerbed information storage stores the information regarding the flowerbeds in association with the frequent word; and the flowerbed recommendation displayer recommends and displays a flowerbed based on the identified frequent word.
[4] The flowerbed sales order system according to [3], including a website specificator that enables the user to specify the website, wherein the frequent word identificator identifies the frequent word on the specified website.
[5] The flowerbed sales order system according to any one of [1] to [4], including an evaluation storage that stores evaluations of other users regarding the flowerbeds, wherein the flowerbed recommendation displayer recommends and displays a flowerbed based on the evaluations of other users.
[6] The flowerbed sales order system according to any one of [1] to [5], including an attribute storage that stores an attribute of a user and attributes of other users, and a statistics acquirer that acquires statistics regarding the attributes, wherein: the flowerbed information storage stores the information regarding the flowerbeds in association with the attributes; and the flowerbed recommendation displayer recommends and displays a flowerbed based on the acquired statistics.
[7] The flowerbed sales order system according to any one of [1] to [6], including: a group storage that stores flowerbed options classified into groups; a recommendation probability storage that stores probability of recommending and displaying each of the flowerbed options; a selection acceptor that accepts selection of the flowerbed option; and a recommendation probability increaser that increases, with a prescribed condition, the probability of recommending and displaying the options that are included in the group of the selected option after the selection is accepted and before recommendation and display are to be done again.

[8] The flowerbed sales order system according to any one of [2] to [7], wherein the flowerbed recommendation displayer includes a displayer that recommends and displays a flowerbed that is different from the flowerbed selected based on one or more condition selected from a group consisting of the order history of the user, a frequent word on a prescribed website, evaluations of other users, and an attribute of the user.

[9] A flowerbed sales order program for causing a server apparatus capable of communicating with a user terminal to function as: a flowerbed information storage that stores information regarding flowerbeds; and an order placement request receiver that receives an order placement request for the recommended and displayed flowerbed based on a prescribed condition.

[10] A flowerbed sales order program for causing a user terminal capable of communicating with a server apparatus to function as: a flowerbed information storage that stores information regarding flowerbeds; a flowerbed recommendation displayer that recommends and displays a flowerbed based on a prescribed condition; and an order placement request transmitter that transmits an order placement request of the recommended and displayed flowerbed.

[11] A flowerbed sales order method executed in a flowerbed sales order system comprising a user terminal and a server apparatus capable of communicating with the user terminal, the method including: a step of storing information regarding flowerbeds; a step of recommending and displaying a flowerbed based on a prescribed condition; a step of transmitting an order placement request of the recommended and displayed flowerbed; and a step of receiving the order placement request.

Advantageous Effects of Invention

With the present invention, user can order a flowerbed with a simple method without having the user design the flowerbed from scratch.

BRIEF DESCRIPTION OF THE DRAWINGS

FIG. 3 is a flowchart showing an example of a flowchart regarding processing of recommendation and display of the flowerbed and an order placement request according to the embodiment of the present invention.

FIG. 8 is a table showing an example of a plant data table according to the embodiment of the present invention.

FIG. 10 is a flowchart showing an example of a flowchart regarding the processing for making the flowerbed image to be recommended and displayed based on the order history according to the embodiment of the present invention.

FIG. 11 is a table showing an example of the order history table according to the embodiment of the present invention.

FIG. 12 is a table showing an example of a recommended flowerbed template table according to the embodiment of the present invention.

FIG. 13 is a flowchart showing an example of a flowchart regarding the processing for making the recommended flowerbed template based on the frequent words on the website according to the embodiment of the present invention.

FIG. 14 is a table showing an example of a frequent word table according to the embodiment of the present invention.

FIG. 17 is a table showing an example of an attribute table according to the embodiment of the present invention.

FIG. 18 is a table showing an example of a statistics table according to the embodiment of the present invention.

FIG. 20 is a table showing an example of a probability table A according to the embodiment of the present invention.

FIG. 21 is a flowchart showing an example of a flowchart regarding processing for updating the recommendation display probability A of the flowerbed options according to the embodiment of the present invention.

FIG. 22 is a table showing an example of a probability table B according to the embodiment of the present invention.

FIG. 24 is a flowchart showing an example of a flowchart regarding processing for making a flowerbed from scratch and placing and receiving an order thereof according to the embodiment of the present invention.

DESCRIPTION OF EMBODIMENTS

The embodiments of the present invention will be described with reference to the accompanying drawings hereinafter. In the following, the disclosure regarding effects are an aspect of the embodiments of the present invention, and are not limited to the following embodiments. Further, the sequential order of each processing constituting flowcharts described in the Description is a random order within a range where there is no confliction or inconsistency generated in the processing contents.

The flowerbed sales order system according to the embodiment includes: a flowerbed information storage that stores information regarding flowerbeds; a flowerbed recommendation displayer that recommends and displays a flowerbed according to a prescribed condition; an order placement request transmitter that transmits an order placement request for the recommended and displayed flowerbed; and an order placement request receiver that receives the order placement request. Such configuration makes it possible for the user to place an order of a flowerbed with a simple method without designing the flowerbed from scratch.

Note that "flowerbed" in the present Description means not only those with flowers only planted therein but also those with the whole kinds of plants such as trees and plants other than flowers planted therein.

Configuration of Flowerbed Sales Order System

Figure 1:
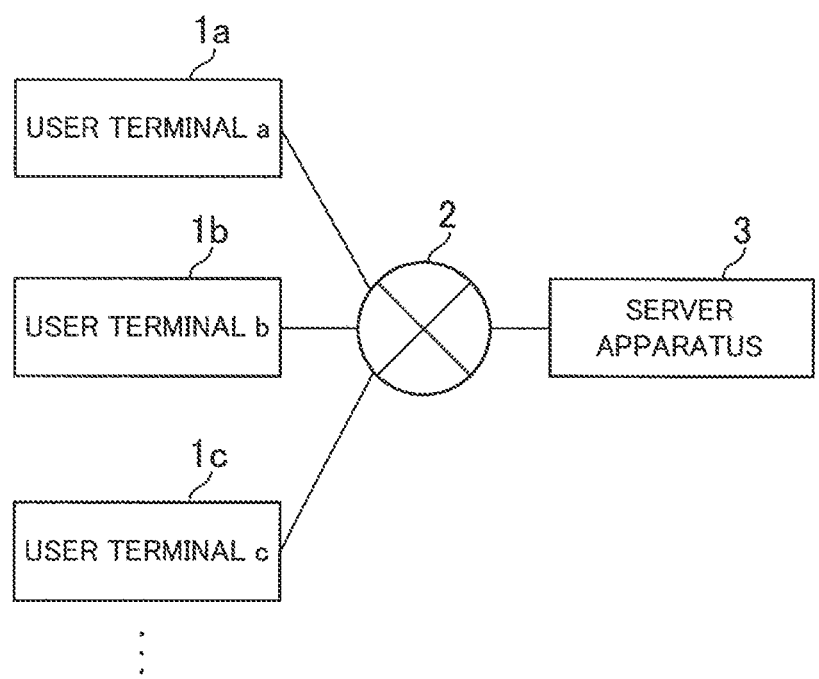
FIG. 1 is a diagram illustrating a configuration of the flowerbed sales order system according to the embodiment of the present invention.

FIG. 1 is a diagram illustrating a configuration of the flowerbed sales order system according to the embodiment of the present invention. As illustrated, the flowerbed sales order system according to the embodiment is configured with a plurality of user terminals 1 (user terminals 1a, 1b, 1c, . . . ), a communication network 2, and a server apparatus 3.

The user terminal 1 is a terminal with which the user views flowerbed images and places sales orders and the like of flowerbeds. While not limited thereto, examples of the user terminal 1 may be a personal computer, a smartphone, a tablet terminal, a mobile phone, and a PDA. The user terminal 1 may be an apparatus that is connectable to the server apparatus 3 via the communication network 2.

As the communication network 2, for example, it is possible to use various kinds of wired or wireless known communication networks such as the Internet, wired or wireless public telephone network, wired or wireless LAN, and a dedicated line.

The server apparatus 3 is a management/operation server that transmits and receives information to/from the user terminal 1, and stores and analyzes the history of communication with the user terminal 1.

Figure 2A:
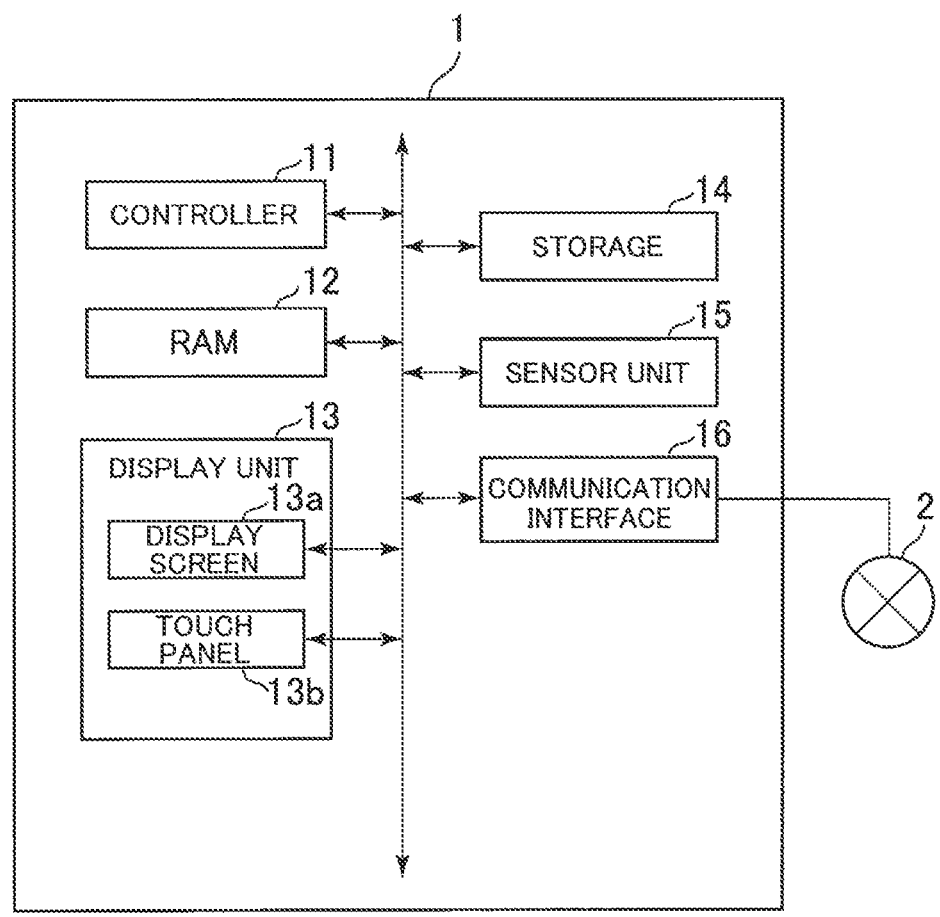
FIG. 2A is a block diagram illustrating a configuration of the user terminal and FIG. 2B is a block diagram illustrating a configuration of the server apparatus, according to the embodiment of the present invention.

FIG. 2A is a block diagram illustrating a configuration of the user terminal according to the embodiment of the present invention. As illustrated, the user terminal 1 includes a controller 11, a RAM 12, a display unit 13, a storage 14, a sensor unit 15, a communication interface 16, and the like, and is capable of connecting to the communication network 2 via the communication interface 16.

The controller 11 refers to and executes programs and data stored in the storage 14 and the like. The RAM 12 is a work area of the controller 11. Operations made by the user on a touch panel 13b that is provided to the display unit 13 and information detected by the sensor unit 15 are stored in the RAM 12 as input information, and the controller 11 executes various kinds of calculation processing based on the input information.

The display unit 13 includes a display screen 13a that: recommends and displays the flowerbed; displays information necessary for the user to make a planting arrangement plan such as modifying the recommended and displayed flowerbed; and displays an image showing the state and the like of the flowerbed identified by selection made by the user. Further, the display unit 13 includes the touch panel 13b that senses a pressure applied by a finger, a stylus, or the like and shift of the position of the finger or the like on the panel, and detects a change and the like of the coordinate position thereof. Note that the display screen 13a and the touch panel 13b may be configured integrally.

The storage 14 is used for a memory area for saving the programs and data, and is capable of storing the data received from the server apparatus 3.

The sensor unit 15 includes a GPS sensor. Further, it is also possible to include various kinds of other sensors such as a fingerprint authentication sensor, a proximity sensor, an accelerometer, a gyro sensor, a magnetic sensor, a luminance sensor, and a barometric pressure sensor.

Figure 2B:
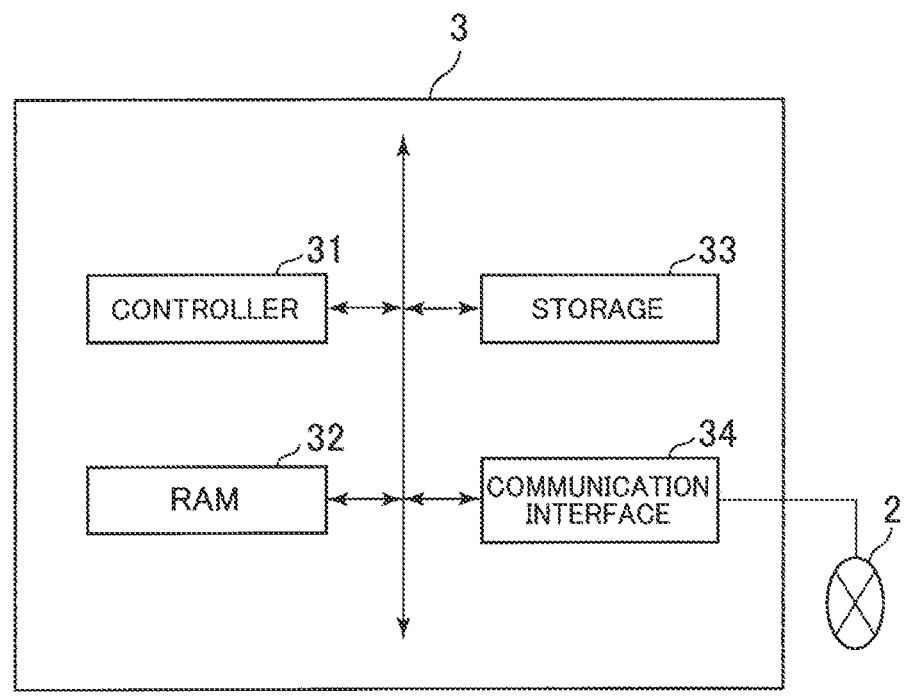

FIG. 2B is a block diagram illustrating a configuration of the server apparatus according to the embodiment of the present invention. As illustrated, the server apparatus 3 includes a controller 31, a RAM 32, a storage 33, a communication interface 34, and the like, and is capable of connecting to the communication network 2 via the communication interface 34.

The controller 31 refers to and executes programs and data stored in the storage 33. The RAM 32 is a work area of the controller 31. In the storage 33, data inputted in the user terminal 1 and received via the communication interface 34, for example, is stored.

Functions of User Terminal 1

Next, main functions of the user terminal 1 will be described. The user terminal 1 includes a flowerbed recommendation display function, a selection accepting function, an order placement request transmitting function, a website specifying function, an evaluation inputting function, an attribute inputting function, and the like.

The flowerbed recommendation display function has a function of recommending and displaying flowerbed images according to the prescribed condition. The flowerbed recommendation display function recommends and displays flowerbed images that may be attractive to the user on the display screen 13a with a relatively high probability. For example, it is possible to display a plurality of options of flowerbed images in a prescribed option display section of the display screen 13a, for example.

The selection accepting function has a function of accepting selection of the flowerbed options. The user terminal 1 can accept the selection of the flowerbed options by a prescribed operation such as tapping the options of a plurality of flowerbed images displayed in the prescribed option display section.

The order placement request transmitting function has a function of transmitting an order placement request of the recommended and displayed flowerbed. The order placement request transmitting function transmits, to the server apparatus 3 via the communication interface 16, an order placement request regarding seeds and/or seedlings of plants necessary for making the flowerbed according to the planting arrangement plan of the user.

The website specifying function has a function of enabling the user to specify a website. The user can allow the flowerbed sales order system to learn the preference of the user by specifying and inputting URL of a favorite website. Specifically, frequent words in the website specified by the user are identified, and the flowerbed images associated with the frequent words are to be recommended and displayed on the user terminal 1.

The evaluation inputting function has a function of inputting evaluation of the user regarding the flowerbeds. The user can input the evaluation on the flowerbeds by voting for the preferred flowerbed on the display screen of a flowerbed contest or the like. The flowerbed image with a greater number of votes may readily be recommended and displayed on many of the user terminals 1 as the flowerbed image with a high rating of user evaluation.

The attribute inputting function has a function of inputting the attribute of the user. The inputted attribute of the user is used for acquiring statistics of the attribute of the user. As the attribute, gender, age, residence area, birthplace, annual income, occupation, and the like can be inputted.

Subsequently, other functions of the user terminal 1 will be described. The user terminal 1 includes a flowerbed shape inputting function, a planting timing inputting function, a plant layout inputting function, a planting arrangement plan transmitting function, a flowerbed state image receiving function, a viewpoint change instructing function, a timing change instructing function, a change instruction transmitting function, a number-of-seeds-and-seedlings receiving function, and the like.

The flowerbed shape inputting function has a function of inputting information regarding the shape and the area of the flowerbed desired by the user. Input of the information regarding the shape of the flowerbed may be done by displaying a grid of a plurality of squares on the display screen 13a and performing an operation such as tapping the squares to make the shape of the flowerbed desired by the user on the display screen 13a, for example. Further, input of the information regarding the area of the flowerbed is done by having the user input the actual length corresponding to the length of one side of the square forming the grid, for example.

The planting timing inputting function has a function of inputting information regarding planting timing and/or appreciation timing of the plants desired by the user. Input of the planting timing and the like is done by displaying one year in bar display on the display screen 13a and performing an operation such as swiping on the bar. Note that there are some variations in the planting timing and blooming timing of the plants depending on the regions, so that it is preferable for the planting timing inputting function to further have a function of inputting information regarding the region where the flowerbed is to be made. Note that input of the information regarding the region where the flowerbed is to be made may be omitted by using the current location of the user terminal 1 detected by the GPS sensor provided to the sensor unit 15 or by using the address of the user registered in advance as the flowerbed making region.

The plant layout inputting function has a function of inputting layout and kinds of the plants in the flowerbed for each region configuring the flowerbed. Input of the layout and kinds of the plants is done by selecting the color and the plant desired by the user for each of a plurality of squares configuring the flowerbed displayed on the display screen 13a, for example. For example, color selection input is done by popup-displaying a color pallet 63 including a plurality of colors and having the user select the color desired for the tapped square from the colors displayed in the color pallet 63. Further, input of the kinds of the plants is done by displaying information regarding the plants corresponding to the color selected by the user, and having the user select the desired plant from the displayed plants. When the planting timing and the like are selected by the planting timing inputting function described above, only the information regarding the plants corresponding to the color selected by the user and corresponding to the planting timing and the like selected by the user is displayed on the display screen 13a. Note that it is also possible to employ a configuration with which input of the color and the plant desired by the user can be done collectively for a plurality of squares.

The planting plan transmitting function has a function of transmitting the information regarding a planting plan inputted by the user to the server apparatus 3 via the communication interface 16. Note that "planting plan" in the present Description means a flowerbed making plan of the user, which is configured with at least the shape and area of the flowerbed as well as the layout and kinds of the plants in the flowerbed.

The flowerbed state image receiving function has a function of receiving images showing the state of the flowerbed made by the server apparatus 3 based on the planting plan of the user from the server apparatus 3 via the communication interface 16. The received image showing the state of the flowerbed is displayed on the display screen 13a. Note that "image showing state of flowerbed" in the present Description means a conceptional finished drawing of the flowerbed that is made according to the planting plan of the user.

The viewpoint change instructing function has a function of inputting an instruction for changing the image showing the state of the flowerbed received from the server apparatus 3 to an image viewed from different directions and/or different angles. Input of a viewpoint change instruction is done by displaying buttons associated to prescribed directions and/or angles on the display screen 13a and performing an operation such as tapping the button corresponding to the direction and/or the angle desired by the user, for example.

The timing change instructing function has a function of inputting an instruction for changing the image showing the state of the flowerbed received from the server apparatus 3 to an image showing the state of the flowerbed in a specific timing. Input of a timing change instruction is done by displaying one year in bar display on the display screen 13a and performing an operation such as swiping on the bar, for example.

The change instruction transmitting function has a function of transmitting, to the server apparatus 3 via the communication interface 16, the information regarding the viewpoint change instruction and/or the timing change instruction inputted by the user.

The number-of-seeds-and-seedlings receiving function has a function of receiving, from the server apparatus 3 via the communication interface 16, the information regarding the number of seeds and/or seedlings necessary for making the flowerbed according to the planting plan of the user. Note that the number-of-seeds-and-seedlings receiving function may further have a function of receiving, from the server apparatus 3 via the communication interface 16, the information regarding intervals for planting the plants in each region configuring the flowerbed and the estimated cost.

Functions of Server Apparatus 3

Next, main functions of the server apparatus 3 will be described. The server apparatus 3 includes a flowerbed information storing function, an order history storing function, a frequent word identifying function, an evaluation storing function, an attribute storing function, a statistics acquiring function, a group storing function, a recommendation probability storing function, a recommendation probability increasing function, and the like.

The flowerbed storing function has a function of storing information regarding flowerbeds. The information regarding the flowerbed includes kinds of plants, colors, planting timing, appreciation timing, individual area, as well as area, shape, patterns, fee, images and the like of the flowerbed, for example.

The order history storing function has a function of storing order placement requests of the flowerbed made by the user as an order history. As the order history, it is possible to store the kinds of plants, colors, planting timing, appreciation timing, individual area, as well as area, shape, patterns, fee, images and the like of the flowerbed, for example.

The frequent word identifying function has a function of identifying frequent words on a prescribed website. It is possible to learn the preference of the user by identifying the frequent words on the prescribed website specified by the user. After identifying the frequent word, the flowerbed image associated with the identified frequent word is recommend and displayed.

The evaluation storing function has a function of storing evaluation of the user regarding the flowerbed. Evaluation of the user can be acquired by having the user vote for the preferred flowerbed in a flowerbed contest or the like. The acquired voting information can be stored as the evaluation of the flowerbed images.

The attribute storing function has a function of storing the attribute of the user and attributes of other users. The stored attributes are used for acquiring statistics of the attributes. As the attributes, it is possible to store gender, age, residence area, birthplace, annual income, occupation, and the like.

The statistics acquiring function has a function of acquiring the statistics regarding the attributes. It is the function for identifying the flowerbed image exhibiting high relevancy with the attribute from the statistics regarding the attributes of the other users and the image of the flowerbeds ordered by the other users, and recommending and displaying the identified flowerbed image for the users having the common attribute.

The group storing function has a function of storing options of the flowerbeds classified into groups. For example, when a certain flowerbed is selected, identifying a group associated with that flowerbed makes it possible to learn images of other flowerbeds associated with the identified group as the images of the flowerbeds that may be highly probable to be preferred by the user.

The recommendation probability storing function has a function of storing the probability of recommending and displaying the option for each of the options of the flowerbeds. Through setting a high probability for recommending and displaying the option of the flowerbed that is highly probable to be preferred by the user and setting a low probability for recommending and displaying the option of the flowerbed that is not highly probable to be preferred by the user, for example, it becomes highly possible to be able to recommend and display the image of the flowerbed that suits the preference of the user.

The recommendation probability increasing function has a function of increasing the probability of recommending and displaying the options that are included in the group of the selected option with a prescribed condition after the selection is made and before recommending and displaying the options again. For example, when a certain flowerbed is selected, the group associated with that flowerbed is identified and the probability of recommending and displaying the images of other flowerbeds associated with the identified group is increased so that the probability of recommending and displaying the images of the flowerbeds that may be preferred by the user can be increased.

Subsequently, other functions of the server apparatus 3 will be described. The server apparatus 3 has a planting plan receiving function, a plant layout identifying function, a display data storing function, a flowerbed state drawing function, a flowerbed state image transmitting function, a change instruction receiving function, a number-of-seeds-and-seedlings calculating function, a number-of-seeds-and-seedlings transmitting function, an order placement request receiving function, an order reception confirming function, and the like.

The planting plan receiving function has a function of receiving the information regarding a planting plan inputted by the user from the user terminal 1 via the communication interface 16, and storing the information to the storage 33.

The plant layout identifying function has a function of identifying layout of plants of different colors and/or different kinds for each of a plurality of regions configuring the flowerbed according to the planting plan of the user received by the planting plan receiving function.

The display data storing function has a function of storing the display data regarding the plants used for gardening. As the display data to be stored by the display data storing function, graphic data configured with a plurality of polygons is preferable, for example. Further, the display data may be photo data captured for each of plants of different colors and/or different kinds from a plurality of different directions or angles corresponding to the directions or angles for the flowerbed that can be inputted.

The flowerbed state drawing function has a function of drawing an image showing the state of the flowerbed identified by the plant layout identifying function along with the display data stored by the display data storing function according to the layout in each region of the flowerbed and the plants disposed in each region.

The image to be drawn is preferable to be a two-dimensional image that can be acquired by performing perspective transformation of the state of the flowerbed in a virtual three-dimensional space on a virtual screen. Objects of planted plants are provided within the virtual three-dimensional screen, and it is possible to display the state of the flowerbed viewed from different angles as a two-dimensional image by changing the position of a virtual camera.

Note that the position of the virtual screen is determined according to the position of the virtual camera, and an image projected on the virtual screen is displayed as a two-dimensional image. When generating an image projected on the virtual screen by perspective transformation, hidden surface removal is performed for removing the surface hidden by another object existing in front thereof. As a method of hidden surface removal, it is possible to use Z-buffering, for example.

Graphic data within the virtual three-dimensional space may be configured with a plurality of polygons, for example. Each of the plant objects planted in the virtual three-dimensional space is configured with a plurality of polygons disposed to be able to express the shape of the plant. Those polygons are defined by identifying coordinates of each vertex in a local coordinate system.

When the layout of the plants of the different colors and/or different kinds is identified by the plant layout identifying function for each of a plurality of regions configuring the flowerbed, the plant objects of the identified plants are disposed for each of the regions within the virtual space. Those disposed plant objects (for example, the center of the flowerbed) are the focal point of the virtual camera. When the user inputs a change in the direction or the angle with respect to the flowerbed, only the position of the virtual camera is changed while the position of the focal point of the virtual camera is being fixed so that the images of the flowerbed viewed from different directions and angles can be acquired. In such case, the direction and angle with respect to the flowerbed may be changed continuously or may be changed discontinuously in a gradual manner.

Further, it is also possible to change the state of the flowerbed to be displayed on the display screen in accordance with the passage of time from planting of the plants. For the plant objects configured with the polygons, a plurality of pieces of object data are stored in advance for each of the plans of different colors and/or different kinds in accordance with the passage of time from planting of the plants. When the user inputs a change in the timing to be displayed, the plant objects disposed in each of the regions are replaced with plant objects corresponding to the changed timing for each color and kind of the plants. Such configuration makes it possible to check the state of growth and the state of change in the plants within the flowerbed, so that it is possible to know in advance that the flowerbed lacks in balance such that some of the flowers are in bloom but some of the flowers are not depending on the timing, for example.

As the graphic data within the virtual three-dimensional space, it is possible to use photo data that is different from the objects configured with polygons. As the photo data, stored in advance is the photo data of the plants viewed from a plurality of different directions or angles corresponding to the directions or angles for the flowerbeds that can be inputted for each of plants of different colors and/or different kinds. In this case, the directions and angles for the flowerbeds can be gradually changed. When the layout of the plants of the different colors and/or different kinds is identified by the plant layout identifying function for each of a plurality of regions configuring the flowerbed, the photo data of the identified plants is disposed in each of the regions to be vertical to the optic axis of the virtual camera.

When a change in the direction or angle for the flowerbed is inputted, the photo data being disposed is replaced with the photo data according to the changed direction for the flowerbed. The replaced photo data is also disposed to be vertical to the optic axis of the virtual camera. Such configuration makes it possible to express the planted plants as the two-dimensional image by using the photo data, so that the state of the flowerbed can be displayed in a state closer to the reality.

Further, it is also possible to change the state of the flowerbed to be displayed on the display screen in accordance with the passage of time from planting of the plants. As the photo data, a plurality of pieces of photo data are stored in advance for each of the plants of different colors and/or different kinds in accordance with the passage of time from planting of the plants. When the user inputs a change in the timing to be displayed, the photo data disposed in each of the regions is replaced with the photo data corresponding to the changed timing for each of the colors and kinds of the plants.

Further, as a simpler method, it is possible to dispose cubic objects in colors and patterns corresponding to the plants disposed in each of the regions when the layout of the plants of different colors and/or kinds is identified for each of a plurality of regions configuring the flowerbed, and to perform perspective transformation of those cubic objects on the virtual screen to acquire a two-dimensional image. In this case, when a change in the direction or angle for the flowerbed is inputted, the position of the virtual camera is changed while the position of the focal point of the virtual camera is being fixed so that the image of the flowerbed viewed from different directions and angles can be acquired. The direction and angle with respect to the flowerbed may be changed continuously or may be changed discontinuously in a gradual manner. Such configuration makes it possible to display the state of the flowerbed by changing the angles and directions while suppressing processing load.

The flowerbed state image transmitting function has a function of transmitting, to the user terminal 1 via the communication interface 16, the information regarding the image showing the state of the flowerbed drawn by the flower state drawing function.

The change instruction receiving function has a function of receiving, form the user terminal 1 via the communication interface 16, the information regarding a viewpoint change instruction and/or a timing change instruction inputted by the user. Upon receiving the viewpoint change instruction and/or the timing change instruction, an image according to the received change instruction is drawn by the flowerbed state drawing function and transmitted by the flowerbed state image transmitting function to the user terminal 1 via the communication interface 16.

The number-of-seeds-and-seedlings calculating function has a function of calculating the information regarding the number of seeds and/or seedlings of the plants necessary for making the flowerbed according to the planting plan of the user. Note that the number-of-seeds-and-seedlings calculating function may further have a function of calculating the intervals for planting the plants within each of the regions configuring the flowerbed and the estimated cost.

The number-of-seeds-and-seedlings transmitting function has a function of transmitting, to the user terminal 1 via the communication interface 16, the information regarding the number of seeds and/or seedlings of the plants necessary for making the flowerbed according to the planting plan of the user calculated by the number-of-seeds-and-seedlings calculating function. Note that the number-of-seeds-and-seedlings transmitting function may further have a function of transmitting, to the user terminal 1 via the communication interface 16, the intervals for planting the plants within each of the regions configuring the flowerbed and the estimated cost.

The order placement receiving function has a function of receiving the information regarding an order placement request for the seeds and/or seedlings of the plants necessary for making the flowerbed according to the planting plan of the user from the user terminal 1 via the communication interface 16, and storing the information to the storage 33. The order reception confirming function has a function of confirming the information regarding the order placement request received by the order placement request receiving function as order reception information.

Startup of Application

Subsequently, the presupposition of the embodiment of the present invention will be described. An example of the embodiment of the present invention may be an application installed in a smartphone. When an application is started up in the user terminal 1, identification information and the like given to the user terminal 1, for example, are acquired as the information regarding the startup. Further, for identifying the user, it is also possible to communicate with the server apparatus 3 and log in by using an account of the user given in advance or possible to transmit the identification information of the user terminal 1 acquired at the time of startup to the server apparatus 3. The identification information of the user terminal 1 or the account of the user for logging in is unique data for identifying the user, which is stored in the server apparatus 3 as the user ID.

The personal information of the user is stored in the server apparatus 3 by being associated with the user ID. Examples of the items of the personal information to be stored may be "name", "gender", "birthdate", "address", "phone number", "e-mail address", "password", "payment method", "credit card number", and "use history". As the name and the like of the user, information inputted by the user when using the application for the first time is stored.

Recommendation and Display of Flowerbed

FIG. 3 is a flowchart showing an example of a flowchart regarding processing of recommendation and display of the flowerbed and an order placement request according to the embodiment of the present invention. After the user logs in, the flowerbed sales order system displays a home screen or the like shown in FIG. 4 on the display screen 13a of the user terminal 1, and recommends and displays options of flowerbeds (step S11).

Figure 4:
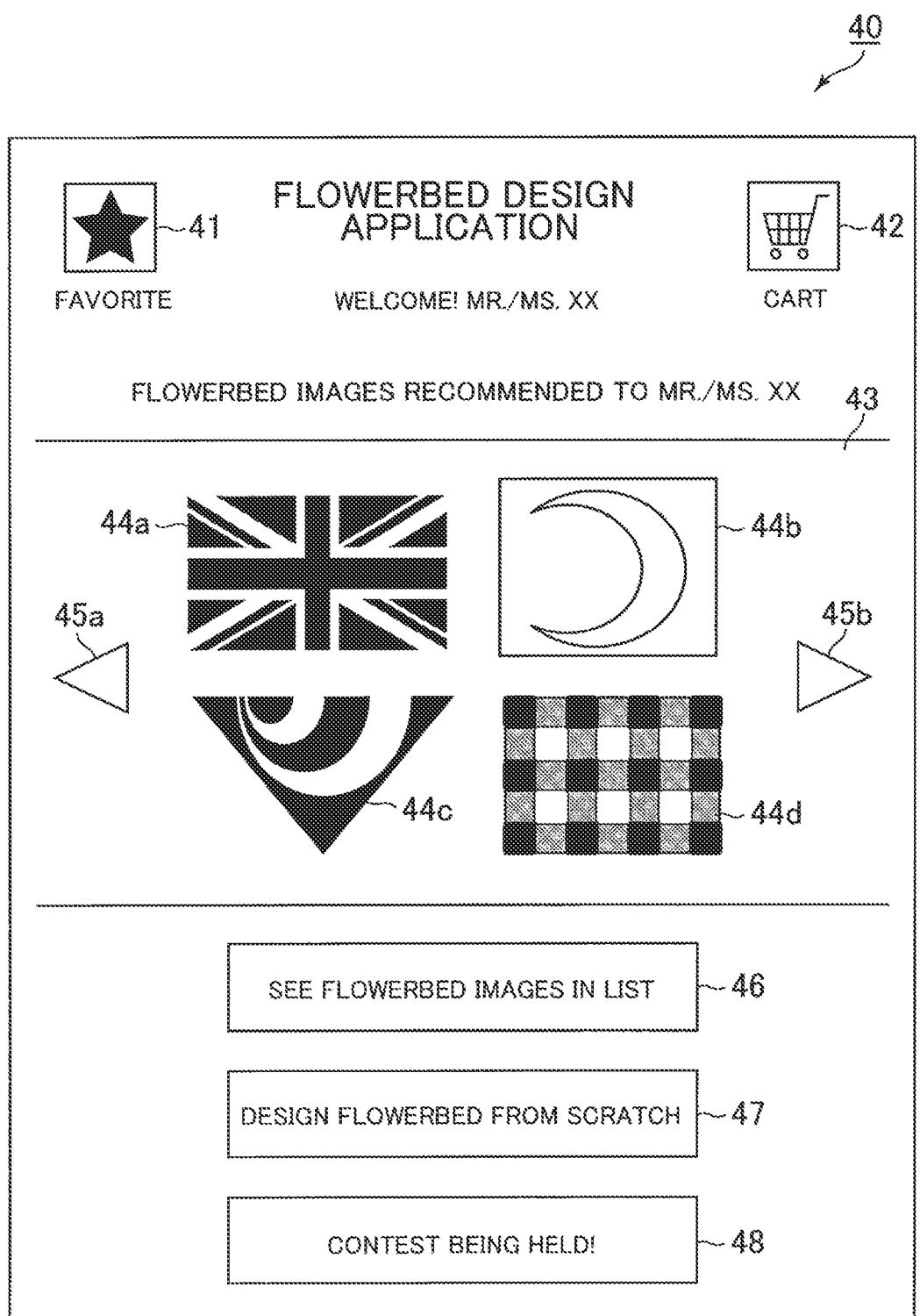
FIG. 4 is a view showing an example of the home screen according to the embodiment of the present invention.

FIG. 4 is a view showing an example of the home screen according to the embodiment of the present invention. On a home screen 40, displayed are a favorite icon 41, a cart icon 42, an option display section 43, flowerbed options 44a to 44d, option switching icons 45a, 45b, a list display icon 46, a flowerbed designing icon 47, and a contest icon 48.

In the option display section 43, the flowerbed options 44a to 44d and the option switching icons 45a, 45b are displayed. The user can display flowerbed options other than the flowerbed options 44a to 44d by tapping the option switching icon 45a or 45b, for example. With such configuration, a plurality of flowerbeds can be recommended and displayed in relatively large images.

The list display icon 46 is for displaying a list of more flowerbed options other than the flowerbed options 44a to 44d recommended and displayed in the option display section 43. The user can display a list of more flowerbed options on the display screen 13a by tapping the list display icon 46, for example.

After making a selection from the options of the flowerbeds displayed in a mode described above by an operation such as tapping (step S12), the display screen is shifted to a screen where the shape and/or the size of the flowerbed can be modified (step S13).

Modification of Shape and Area of Flowerbed

Figure 5:
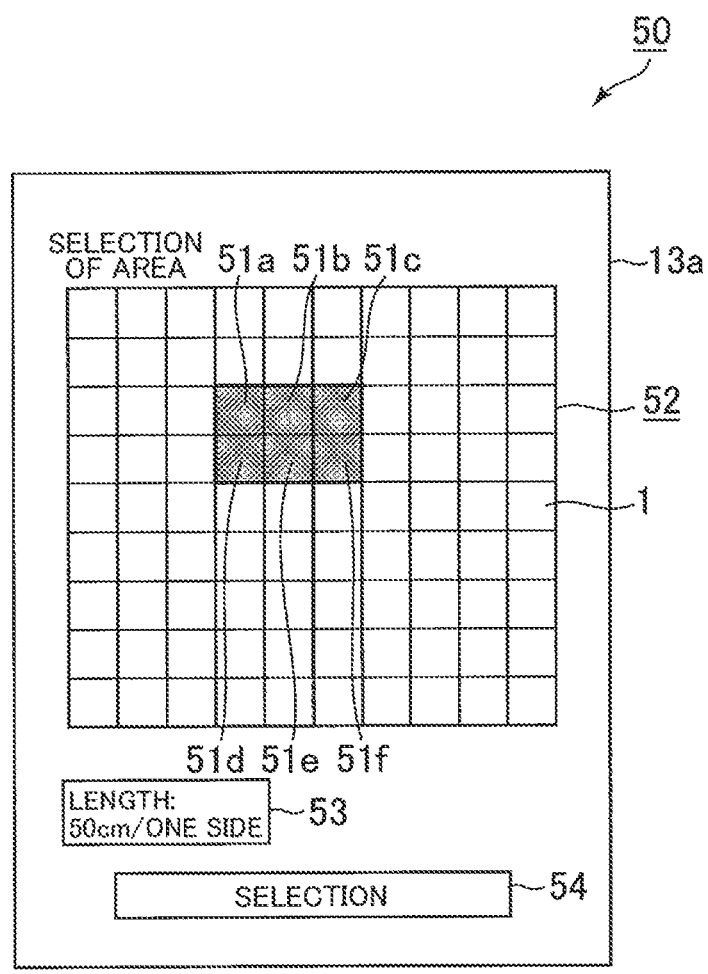
FIG. 5 is a view showing an example of a shape-and-the-like modification screen for modifying the information regarding the shape and the area of the flowerbed according to the embodiment of the present invention.

FIG. 5 is a view showing an example of a shape-and-the-like modification screen for modifying the information regarding the shape and the area of the flowerbed according to the embodiment of the present invention. When desired to modify the flowerbed recommended and displayed, the user can display the shape-and-the-like modification screen 50 as shown in FIG. 5 on the display screen 13a. On the shape-and-the-like modification screen 50, it is possible to display a flowerbed shape input section 52 configured with a grid of a plurality of squares 51, a length input section 53 for inputting actual length corresponding to the length of one side of the square 51, and a selection button 54 for confirming the information inputted to the flowerbed shape input section 52 and the length input section 53.

The user modifies the shape of the flowerbed by tapping the squares 51 displayed on the display screen 13a. The squares 51 tapped by the user are squares selected by the user as the region configuring the shape of the flowerbed, and displayed in a color different from that of the region not configuring the flowerbed. As described above, by displaying the squares configuring the flowerbed with a color different from the squares not configuring the flowerbed, the current shape of the flowerbed can be clearly presented. For example, as in FIG. 5, when the squares 51a to 51f are displayed in a color different from that of the other squares 51, the shape formed by the squares 51a to 51f is the shape of the flowerbed. As the mode for indicating that the squares are configuring the flowerbed, it is possible to employ a mode with which the outer frame of the shape formed by the squares configuring the flowerbed is shown with a thick line or a colored line or with which a pattern such as hatching is applied in the squares configuring the flowerbed.

When the user taps the length input section 53 displayed on the display screen 13a, lengths selectable as the actual length corresponding to the length of one side of the square 51 are displayed in a pulldown menu. The user can modify the area of the flowerbed by selecting the desired length from the selectable lengths displayed in the pulldown menu. Note that numerical values may directly be inputted as the selectable lengths. The user taps the selection button 54 to determine the shape and the area of the flowerbed.

Modification of Colors of Plants

Figure 6:
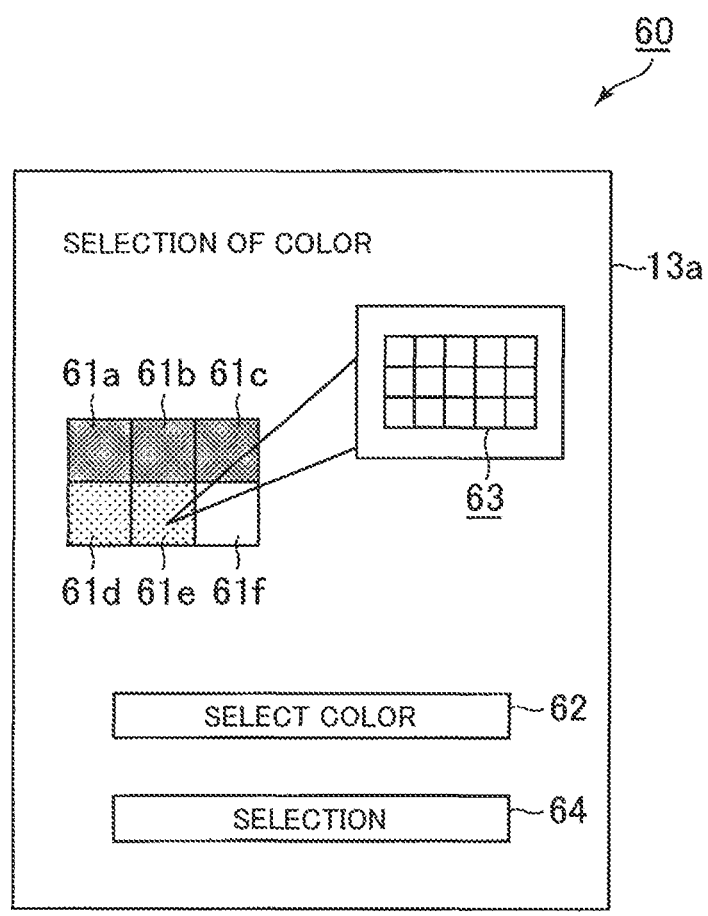
FIG. 6 is a view showing an example of a color modification screen for inputting colors of each of the regions configuring the flowerbed according to the embodiment of the present invention.

FIG. 6 is a view showing an example of a color modification screen for inputting colors of each of the regions configuring the flowerbed according to the embodiment of the present invention. After completing modification of the shape and/or the area of the flowerbed in step S13 or after skipping step S13 without modifying the shape and/or the area of the flowerbed, a color modification screen 60 as shown in FIG. 6 is displayed on the display screen 13a. The colors of each of the regions configuring the flowerbed can be modified by an operation such as tapping made on the color modification screen 60 (step S14).

On the display screen 13a, it is possible to display a grid of plurality of squares 61 configuring the flowerbed, a color selection start button 62, a color pallet 63, and a selection button 64 for confirming the inputted color information. The user selects the square 61 for modifying the color by tapping the square 61 displayed as the region configuring the flowerbed. As the square 61 for modifying the color, a plurality of squares can be selected simultaneously.

Next, when the color selection start button 62 is tapped, the color pallet 63 configured with a plurality of colors is popup displayed. The user modifies the color for the selected square 61 by selecting the desired color from the colors included in the color pallet 63. Further, it is also possible to display the color pallet 63 from the beginning on the display screen 13a without providing the color selection start button 62. The color pallet 63 may be configured to be popup displayed, when the squares 61 for modifying the colors are selected. Modification of the colors is completed by tapping the selection button 64 in a state where input of the colors for all the squares 61 is completed.

In FIG. 6, the squares 61a to 61c are squares for which the color is already inputted, and the inputted color is displayed in the squares 61a to 61c. The squares 61d and 61e are squares currently selected by the user as the squares for modifying the color. The squares 61d and 61e are clearly presented as the squares being selected by the user by a mode with which the squares are highlighted, the outer frame thereof are displayed with a thick line or a colored line, a pattern such as hatching is applied, or the like. By selecting the color desired by the user from the colors included in the color pallet 63, the color for the squares 61d and 61e is inputted. The square 61f is a square for which no color is inputted and which is not selected as the square for inputting the color.

Modification of Kinds of Plants

Figure 7:
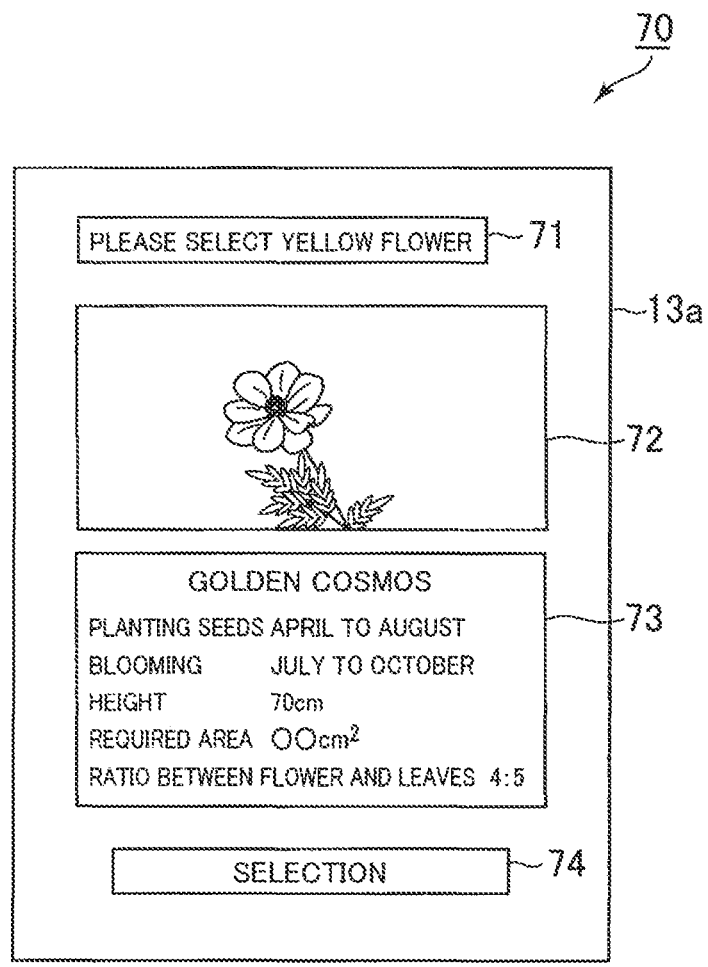
FIG. 7 is a view showing an example of a plant modification screen for modifying the kinds of the plants planted in each of the regions configuring the flowerbed according to the embodiment of the present invention.

FIG. 7 is a view showing an example of a plant modification screen for modifying the kinds of the plants planted in each of the regions configuring the flowerbed according to the embodiment of the present invention. When the colors for each of the regions configuring the flowerbed are determined, a plant modification screen 70 for modifying the kinds of the plants planted in each of the regions as shown in FIG. 7 is displayed on the display screen 13a. The kinds of the plants to be planted in each of the regions configuring the flowerbed are determined by an operation such as tapping made on the input screen (step S14).

The plant modification screen 70 as shown in FIG. 7 can be displayed on the display screen 13a. On the plant modification screen 70, it is possible to display a selection target color display section 71 for displaying the color to be the target of selection, a plant image display section 72, a plant information display section 73, and a selection button 74.

In FIG. 7, a comment "please select yellow flower" is displayed in the selection target color display section 71, which indicates that the plant the user is about to select currently is a plant with a yellow part. The color indicated to be selected in the selection target color display section 71 is one of the colors selected by the user in step S14.

In the plant image display section 72, displayed is an image of a plant having a flower or leaves in the color indicated to select in the selection target color display section 71. In the plant information display section 73, displayed is the information of the plant corresponding to the image displayed in the plant image display section 72. While the information of the plant displayed in the plant image display section 72 in FIG. 7 includes the name of the plant, timing for planting the seeds, blooming timing, height, area required for growing, and ratio between the flower and the leaves, it is also possible to display other information such as shade tolerance, growth difficulty, price, and the like. Further, it is also possible to simultaneously display images and/or information of a plurality of kinds of plants.

The user selects the desired plant by an operation such as swiping on the plant modification screen 70, and determines the kind of the plant by an operation such as tapping the selection button 74. When there are a plurality of colors selected by the user in step S14, the selection described above is done for each of the colors.

While there has been described above the mode with which the colors for all the regions configuring the flowerbed are selected and the kinds of the plants corresponding to the selected colors are selected thereafter, it is also possible to select the color for at least one of the regions configuring the flowerbed and to select the kind of the plant corresponding to the color immediately thereafter. For example, step S14 may be completed by each of the regions configuring the flowerbed. With such configuration, different kinds of plants can be planted even in the regions for which the same color is selected, so that it is possible to make highly diverse flowerbeds.

FIG. 8 is a table showing an example of a plant data table according to the embodiment of the present invention. By saving the colors of the plants and the kinds of the plants in an associated manner in the plant data table, it is possible to limit in advance the kinds of selectable plants according to the determined colors of the plants when the user modifies the kinds of the plants.

In a plant data table 80, colors 82 are stored by being associated with plants 81. For example, when the plant 81 is "hydrangea", a plurality of colors such as "blue", "purple", "red", "pink", and "white" are associated and stored as the colors 82. Further, in the plant data table 80, planting timing 83 suited for planting each of the plants, appreciation timing 84 suited for appreciation, and photo data 85 are stored by being associated with the plants 81 and the colors 82.

For example, when the determined color of the plant is "blue", it is possible to refer to the plant data table 220 to allow the user to select only the plants 81 having the color same as the color of the determined plant registered in the colors 82. With such configuration, it is possible to avoid such case where the kind of and the color of the plant desired by the user do not exist so that it is required to repeat the input many times. Therefore, convenience for the user can be improved.

Further, when the user modifies the kind of the plant, it is possible to limit in advance the selectable kinds of the plants according to the planting timing and appreciation timing of the plants. In such case, it is preferable to accept the input from the user regarding the planting timing and the appreciation timing of the plant before the user selects the color and the kind of the plant. For example, when input of "April" is received from the user, it is possible to refer to the plant data table 80 and to allow the user to select only the plants 81 with "April" that is the same month as the appreciation timing inputted by the user registered in the appreciation timing 84.

Calculation of Fee

When the colors and kinds of the plants are identified for each of a plurality of constituent regions by the processing up to step S14, the fee for making the flowerbed based on the planting plan is calculated (step S15). For example, a fee per unit area or per region is defined for each of the plants or each of the colors of the plants, and the total fee required for making the flowerbed is calculated according to the plants selected in the planting plan. The calculated fee is displayed on the display screen 13a.

Drawing of Flowerbed Image

Figure 9:
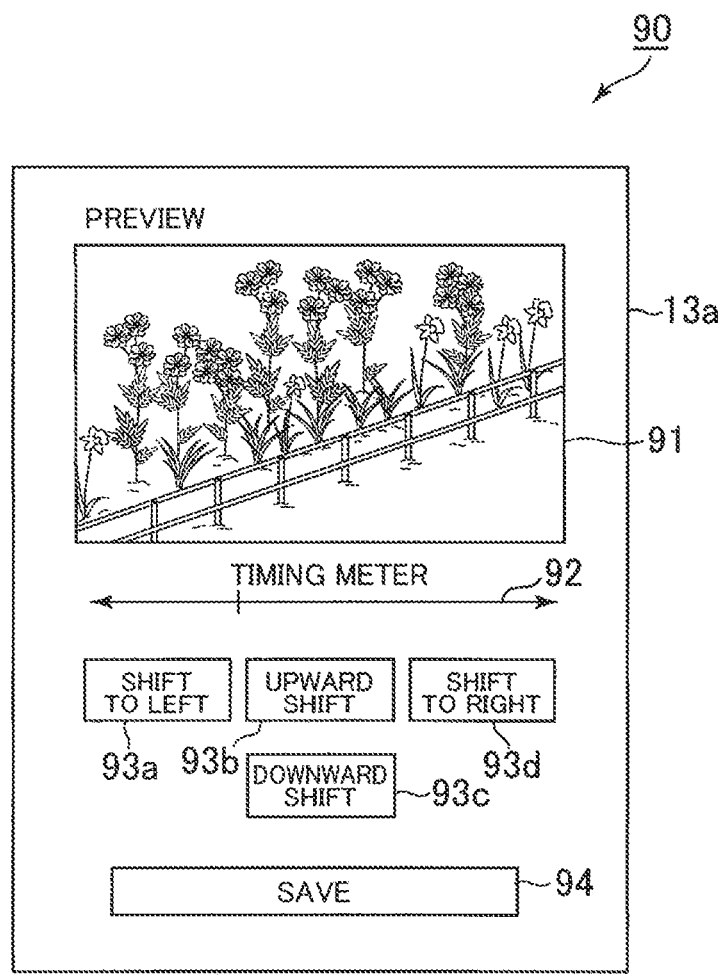
FIG. 9 is a view showing an example of an input screen for inputting a viewpoint change instruction and/or a timing change instruction according to the embodiment of the present invention.

FIG. 9 is a view showing an example of an input screen for inputting a viewpoint change instruction and/or a timing change instruction according to the embodiment of the present invention. When the layout of the plants of different colors and/or different kinds is identified for each of a plurality of regions configuring the flowerbed, a viewpoint-and-the-like input screen 90 as shown in FIG. 9 is displayed on the display screen 13a and an image showing the state of the flowerbed is drawn (step S16).

On the viewpoint-and-the-like input screen 90, it is possible to display an image display section 91, a timing meter 92, viewpoint change buttons 93, and an image saving button 94.

In the image display section 91, the image showing the state of the flowerbed drawn in step S16 is displayed. When drawing the image showing the state of the flowerbed, the photo data 85 corresponding to the identified plant is extracted for each of the regions configuring the flowerbed by referring to the plant data table 80, and the photo data according to the directions and angles with respect to the flowerbed is disposed. The virtual space where the photo data is disposed is perspective-transformed by having the center of the flowerbed as the focal point of the virtual camera so as to generate the image showing the state of the flowerbed.

In the photo data 85, data of the plants viewed from a plurality of directions or angles corresponding to the directions or the angles for the flowerbed that can be inputted is stored in advance. Further, a plurality of pieces of data according to the passage of time from the planting of the plants are stored in advance for each of the directions or angles. While the photo data 85 is to be stored herein, it is also possible to store object data defined by polygons. For the object data, a plurality of pieces of data are stored in advance according to the passage of time from the planting of the plants.

When the user gives a viewpoint change instruction and/or a timing change instruction (YES in step S17), an image showing the state of the flowerbed is drawn according to the change instruction given by the user and displayed anew on the display screen 13a (step S16). When a change in the direction or the angle with respect to the flowerbed is inputted, the disposed photo data is replaced with the photo data corresponding to the changed direction with respect to the flowerbed by referring to the plant data table 80, and an image is generated again. Further, when a change in the timing to be displayed is inputted by the user, the photo data disposed in each of the regions is replaced with the photo data corresponding to the changed timing and an image is drawn again.

The timing meter 92 is a meter for instructing the change in the timing of the image displayed in the image display section 91, for which one year is displayed in a bar. The user can change the state of the flowerbed to be displayed on the display screen 13a according to the passage of time from the planting of the plant by an operation such as swiping on the timing meter 92.

The viewpoint change buttons 93 are buttons for giving an instruction to change the viewpoint for drawing the image showing the state of the flowerbed. The user can acquire images viewed from different directions or angles with respect to the flowerbed by an operation such as tapping the viewpoint change buttons 93. For example, when a viewpoint change button 93a is tapped, there is displayed an image in which the viewpoint is shifted to the left direction by a prescribed distance with respect to the straight line connecting the viewpoint of the image showing the state of the flowerbed displayed in the image display section 91 and the center of the flowerbed. Further, when a viewpoint change button 93d is tapped, there is displayed an image in which the viewpoint is shifted to the right direction by a prescribed distance with respect to the straight line connecting the viewpoint of the image showing the state of the flowerbed displayed in the image display section 91 and the center of the flowerbed. Furthermore, when a viewpoint change button 93b or 93c is tapped, there is displayed an image of the center of the flowerbed viewed from the viewpoint that is shifted up or down in the height direction by a prescribed distance with respect to the viewpoint of the image showing the state of the flowerbed displayed in the image display section 91.

While the case of discontinuously and gradually changing the direction or angle with respect to the flowerbed is described with FIG. 9, it is also possible to continuously change the direction or angle with respect to the flowerbed according to the viewpoint change instruction. Such continuous change in the direction or the angle with respect to the flowerbed is done by an operation such as swiping on the image display section 91, for example. In such case, the viewpoint for the flowerbed is changed according to the swiping direction and the length thereof.

Provisional Registration of Flowerbed

The image saving button 94 is for provisionally registering and saving the image showing the state of the flowerbed displayed in the image display section 91 and/or the planting plan of the user corresponding to the displayed image showing the state of the flowerbed in the user terminal 1 and/or the server apparatus 3. The saved image and the like can be shared with other users via the communication network 2. The shared image and the like showing the state of the flowerbed can be freely viewed among the users. It is also possible for the users to make a planting plan based on the shared images and the planting plans or by editing those.

When the user is satisfied with the image showing the state of the flowerbed displayed on the viewpoint-and-the-like input screen 90 in step S16, it is possible to do provisional registration such as adding the planting-planned flowerbed to the so-called "shopping cart" by giving an operation instruction of the user terminal 1 (step S18) without giving the viewpoint change instruction and/or timing change instruction (NO in step S17). The user can successively make a planting plan for another flowerbed, and can purchase the flowerbeds added to the shopping cart collectively. The flowerbeds added to the shopping cart can be displayed on the home screen 40 as shown in FIG. 4, for example, by an operation such as tapping the cart icon 42.

By executing the planting plan described above, it becomes possible to store in the server apparatus 3 the flowerbed whose shape is identified and colors and kinds of flowers in each of the regions are selected and, after logging out from the flowerbed sales order system, to log in again and place an order for the flowerbed. The flowerbed provisionally registered by being added to "shopping cart" can also be stored in the server apparatus 3. For such planting-planned flowerbed, the content of the flowerbed is stored by being associated with the identification information of the user terminal 1.

Order Placement of Flowerbed

When the planting-planned flowerbed is provisionally registered in step S18, an order placement button for confirming an order is displayed on the display screen 13a of the user terminal 1. Further, the cost when an order is placed for the flowerbed added to the shopping cart is also displayed on the display screen 13a. As the cost, costs for individual flowerbeds added to the shopping cart as well as the total cost of a plurality of flowerbeds added to the shopping cart are displayed. The user can cancel a part of the flowerbeds added to the shopping cart or redo a part of the planting plans of the flowerbeds added to the shopping cart after checking the total cost required when the order is placed for the flowerbeds. When a part of the planning plans of the flowerbeds added to the shopping cart is to be revised, a series of processing described above is performed again for the flowerbed to be revised.

When input of an order placement request is accepted by tapping the order placement button by the operation instruction of the user (step S19), the order placement request is transmitted to the server apparatus 3 (step S20). In this case, all the flowerbeds added to the shopping cart and provisionally registered are the subjects of the order placement request. While the user can place the order for delivering and making the flowerbeds based on the planting plans made by the user, it is also possible to place orders for seeds, seedlings, and the like necessary for making the flowerbeds. It is also possible to allow the user to select whether to place the order for delivering and making the flowerbeds or to place the order only for delivering seeds, seedlings, and the like of the plants.

When the order placement request of the user is transmitted to the server apparatus 3 in step S20, the order content is received in the server apparatus 3 and the order content is stored in the storage 33 of the server apparatus 3, thereby confirming the order reception. The administrator of the flowerbed sales order system according to the present invention prepares seeds and seedlings of the ordered plants or makes the flowerbeds according to the content of the placed order, and delivers those to the address of the user registered in advance.

Making Recommended Flowerbed Template Based on Order History

Next, processing for making a recommended flowerbed template based on the order history of the user will be described. The flowerbed sales order system according to the embodiment is preferable to include an order history storage that stores the order placement requests for the flowerbeds made by the user as the order history, and the flowerbed recommendation displayer is preferable to recommend and display the flowerbeds based on the order history. With such configuration, it is possible to recommend the flowerbed suited for the preference of the user based on the order history of the user.

The recommended flowerbed template is a template of the flowerbed expected to be preferred by the user, and includes information necessary for configuring the flowerbed. The information necessary for configuring the flowerbed is a bundle of information and the like regarding the shape and area of the flowerbed as well as the kinds and layout of the plants. The recommended flowerbed template can be generated from the order history and the like of the user as will be described in the followings.

FIG. 10 is a flowchart showing an example of a flowchart regarding the processing for making the flowerbed image to be recommended and displayed based on the order history according to the embodiment of the present invention. First, the controller 31 of the server apparatus 3 reads the order history of the user from an order history table 100 stored in the storage 33 (step S21).

FIG. 11 is a table showing an example of the order history table according to the embodiment of the present invention. In the order history table 100, order history ID 102 and order history 103 are stored by being associated with user ID 101. As the items of the order history 103 stored by being associated with the order history ID 102, there are plant name 104, color 105, planting timing 106, appreciation timing 107, individual area 108, flowerbed area 109, shape 110, pattern 111, fee 112, image ID 113, and the like.

Next, the shape and the size of the flowerbed are identified from the order history (step S22). As the shape 110 that can be identified from the order history 103, it is possible to employ a mode with which the information regarding the shapes of the flowerbeds formed by the user by selecting the squares is stored or a mode with which the information regarding the shapes of the flowerbeds formed by the user by selecting the squares is collated with the information regarding general shapes registered in advance, and the information regarding the general shape is stored as the order history.

As the information regarding the shape of the flowerbed, it is possible to call the information regarding the shapes selected by the user in the past or possible to store in advance the information regarding general shapes similar to a certain shape as the order history in the storage 33 and call the information regarding the similar general shape. It is preferable to preferentially call the information regarding the shape that is selected by the user many times in the past among the shapes selected by the user in the past or the general shapes similar to those.

The size of the flowerbed can be identified from the flowerbed area 109 in the order history 103. As the information regarding the area of the flowerbed, the information regarding the area selected by the user in the past may be called, the information regarding the average value of the areas selected by the user in the past may be called, or a prescribed area may be selected among the areas selected by the user in the past or the area of a prescribed range including the average value thereof and the information regarding such area may be called.

After identifying the shape and the size of the flowerbed (step S22) the pattern of the flowerbed is identified (step S23). As the pattern 111 that can be identified from the order history 103, it is possible to employ a mode with which the information regarding the patterns of the flowerbeds formed by the user by selecting the squares is stored or a mode with which the information regarding the patterns of the flowerbeds formed by the user by selecting the squares is collated with the information regarding general patterns registered in advance, and the information regarding the general pattern is stored as the order history.

As the information regarding the pattern of the flowerbed, it is possible to call the information regarding the patterns selected by the user in the past or possible to store in advance the information regarding general patterns similar to a certain pattern as the order history in the storage 33 and call the information regarding the similar general pattern. It is preferable to preferentially call the information regarding the pattern that is selected by the user many times in the past among the patterns selected by the user in the past or the general patterns similar to those.

After identifying the pattern of the flowerbed (step S23), colors of the plants allotted to the regions formed by the pattern are identified (step S24). The colors 105 that can be identified from the order history 103 are colors corresponding to the color pallet 63 on the color modification screen 60 described above and the colors 82 in the plant data table 80.

Means for identifying the color of high order frequency from the past order history is not specifically limited. For example, it is possible to employ a mode with which the order frequency of each of the colors selected by the user from the color pallet 63 is acquired and stored in the storage 33 in advance, and the kinds of the plants to be recommended to the user is identified from the colors of high order frequency.

When there are an extremely great number of colors of the plant that can be selected on the color pallet 63, the typical colors of the plant may be classified into color groups such as a white color group, a pink color group, a red color group, an orange color group, a yellow color group, a green color group, a blue color group, and a purple color group and stored in the storage 33 in advance and the information regarding individual colors that can be selected on the color pallet 63 is associated with the information regarding the color groups and stored in the storage 33 so as to enable the order frequency to be identified easily.

After identifying the color of the plant (step S24), the kind of the plant is identified (step S25). The kind of the plant is identified by the controller 31 by selecting the plant name 104 that is highly relevant with the information such as the colors 105 of the plant selected by the user in the past, the planting timing 106, the appreciation timing 107, or the like among the order history 103. Further, as the order history 103, information regarding whether the plant is an annual plant or a perennial plant or information or the like showing the growth difficulty in scores may be stored in advance to be used as the information for identifying the kinds of the plants. In addition, as the order history 103, information regarding the height of the plants, the area required for growing, the ratio between the flowers and leaves, the shade tolerance, or the like may be used as the information for identifying the kinds of the plants.

Further, for the planting timing and the appreciation timing, it is also possible to classify the timings into January to March, April to June, July to September, and October to December, for example, and store those in the storage 33, and to store the information regarding the planting timings and the appreciation timings in the storage 33 in association with the information regarding the classified timings. It is possible to employ a mode with which the order frequency for each of the classified timings regarding the planting timings and the appreciation timings of the plants selected by the user is acquired and stored in the storage 33, and the planting timings and the appreciation timings of the plants to be recommended to the user are identified from the timings of high order frequency.

The processing described above for identifying the kind of the plant can be performed for each of the regions sectioned with the patterns among the shape of the flowerbed, and it is repeated until covering all the regions. Note that the processing described above may also be performed for each of the squares.

In addition, it is also possible to employ a mode with which the controller 31 senses the timing such as the season or the month where the user is using the application and generates the recommended flowerbed template by preferentially using the information regarding the order history of the timing in the past same as the sensed timing.

For example, when the timing the user is using the application is "Spring", the recommended flowerbed template can be generated by preferentially using the information ordered in "Spring" among the order history.

Further, it is also possible to employ a configuration that includes: means for storing information regarding the number of orders of the plants in the storage; and means for generating the recommended flowerbed template by the controller by using the information regarding the plant that is ordered many times. Such configuration described above makes it possible to incorporate the best-selling plants preferred by many users into the recommended flowerbed template, so that the recommended flowerbed template the user is likely to be pleased with can readily be generated.

In addition, it is also possible to employ a configuration that includes: means for storing information regarding profit margins of the plants; and means for generating the recommended flowerbed template by the controller by using the information regarding the profit margins of the plants. Such configuration described above makes it possible to readily generate the recommended flowerbed template of high profit margin.

When all kinds of the plants are identified by the processing up to step S25, the fee for making the identified flowerbed is calculated (step S26).

At this time, it is possible to employ a mode with which the information regarding the identified flowerbed is saved as the recommended flowerbed template in the storage 33 when the calculated fee satisfies a prescribed condition, and the kinds of the plants are identified again when the calculated fee does not satisfy the prescribed condition. There is no specific limit set for the content of the prescribed condition. However, it is possible to set the condition such as whether or not the fee is in a range falling between the lower limit value and the upper limit value of the fees of the flowerbeds ordered by the user in the past or whether or not the fee is within a range of the average value of the fees of the flowerbeds ordered by the user in the past to a prescribed proportion, for example.

FIG. 12 is a table showing an example of a recommended flowerbed template table according to the embodiment of the present invention. The recommended flowerbed template made in the manner described above is stored in a recommended flowerbed template table 120 shown in FIG. 12. In the recommended flowerbed template table 120, recommendation ID 122 and recommended flowerbed template 123 are stored by being associated with user ID 121. As the items of the recommended flowerbed template 123 stored by being associated with the recommendation ID 122, there are plant name 124, color 125, planting timing 126, appreciation timing 127, individual area 128, flowerbed area 129, shape 130, pattern 131, fee 132, image ID 133, or the like.

The image ID 133 shows IDs associated with the images of the flowerbeds that can be generated from the recommended flowerbed template. By storing the image of the flowerbeds that can be generated from the recommended flowerbed template, the images of the flowerbeds that can be generated from the recommended flowerbed template can be promptly displayed for the user.

Further, it is also possible to employ a mode with which 3D images displayed by using a technology such as virtual reality or augmented reality are saved as the images of the flowerbeds, so that the 3D images of the flowerbeds that can be generated from the recommended flowerbed template can be promptly displayed for the user.

The images of the flowerbeds that can be generated from the recommended flowerbed template can be recommended and displayed in the option display section 43 of the home screen 40 as described above.

Making Recommended Flowerbed Template Based on Frequent Words on Website

The recommended flowerbed template can be made by AI (Artificial Intelligence) or the like capable of artificially achieving human intelligence such as learning, inference, decision, and the like by using a computer.

The flowerbed sales order system according to the embodiment is preferable to include a frequent word identificator that identifies frequent words on a prescribed website, in which the flowerbed information storage is preferable to store the information regarding the flowerbeds in association with the frequent words, and the flowerbed recommendation displayer is preferable to recommend and display the flowerbeds according to the identified frequent words. With such configuration, it is possible to recommend the flowerbeds associated with the frequent words on the prescribed website.

Further, the flowerbed sales order system according to the embodiment is preferable to include a website specificator that enables the user to specify the website, in which the frequent word identificator is preferable to identify the frequent words on the specified website. With such configuration, it is possible to recommend the flowerbeds associated with the frequent words on the favorite website of the user.

FIG. 13 is a flowchart showing an example of a flowchart regarding the processing for making the recommended flowerbed template based on the frequent words on the website according to the embodiment of the present invention. First, processing for scrolling the favorite website is performed (step S31). The favorite website can be registered in advance by the user by the website specificator.

Then, keywords within the specified website are collected (step S32), and frequent words are identified from the collected keywords. For identifying the frequent words, a known filtering method can be used for excluding unimportant words from the frequent words. While there is no specific limit set for the filtering method, it is possible to use a method with which frequent words on some other websites are acquired, and the frequent words also appearing on the other websites are excluded from the frequent words considering that such words are unimportant words, for example.

FIG. 14 is a table showing an example of a frequent word table according to the embodiment of the present invention. The frequent words identified in the manner described above are stored in a frequent word table 140 as shown in FIG. 14. In the frequent word table 140, website information 142, frequent word 143, and the like are stored by being associated with user ID 141. Further, website ID 144, website name 145, URL 146, and the like are stored by being associated with the website information 142. A plurality of kinds of frequent words are stored in a descending order of frequency such as the 1st highest, 2nd highest, and 3rd highest.

When there is no flowerbed image corresponding to the frequent words saved in the storage 33 of the server apparatus 3 (NO in step S34), an image associated with the frequent words is searched (step S35). When there is a flowerbed image corresponding to the frequent words already saved in the storage 33 of the server apparatus 3 (YES in step S34), no search for images for such frequent words is performed and it is determined whether or not there is a flowerbed image corresponding to another frequent words (step S34).

After searching and identifying the image associated with the frequent words (step S35), the identified image is divided into a grid of squares (step S36) and a color is determined for each of the squares (step S37). When determining the color for each of the squares, gradation conversion of image data or the like may be performed. For example, a full-color image with 256 gray scales of R, G, and B may be changed to 4 gray scales to be converted into a full-color image of a total of 64 colors. It is also possible to change each color to other gradation levels such as 16 gray scales, 32 gray scales, or 64 gray scales.

After determining the color for each of the squares (step S37), the kinds of the plants corresponding to the colors are determined (step S37). There is no specific limit set for the criteria for determining the kinds of the plants. However, there may be a method which makes determination based on the order history or the attribute of the user or makes determination based on popularity or high profit margin, for example.

After repeating step S34 to step S38 until the recommended flowerbed template to be recommended and displayed is made for all the stored frequent words, the processing for making the recommended flowerbed template based on the frequent words on the website is ended.

While the method for automatically generating the flowerbed image to be recommended and displayed based on the order history or the frequent words has been described heretofore, the administrator of the system may manually perform each of the steps as appropriate or may add modification. For example, it is also possible to employ a mode with which the administrator of the system makes the recommended flowerbed template based on the identified frequent words without automatically performing the processing of step S34 to step S38. Further, the administrator of the system may make and save images of the recommended flowerbed template to be recommended and displayed from scratch.

Store Evaluation of Flowerbed Contest

The flowerbed sales order system according to the embodiment is preferable to include an evaluation storage that stores evaluations of other users regarding the flowerbeds, in which the flowerbed recommendation displayer is preferable to recommend and display the flowerbeds based on the evaluations of the other users. With such configuration, it is possible to recommend and display the flowerbeds that are rated high by many users.

Figure 15:
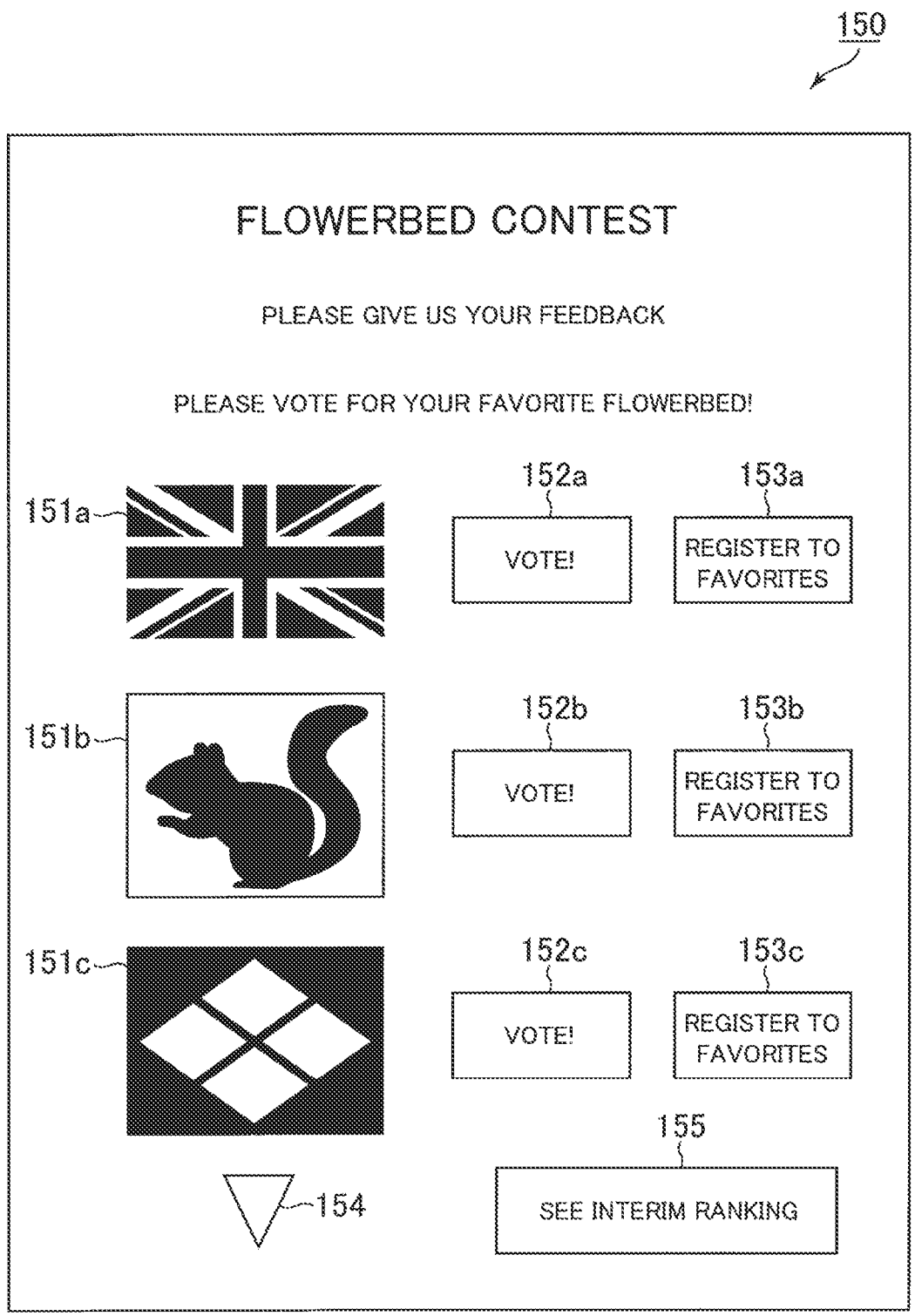
FIG. 15 is a view showing an example of a display screen of a flowerbed contest according to the embodiment of the present invention.

FIG. 15 is a view showing an example of a display screen of a flowerbed contest according to the embodiment of the present invention. A flowerbed contest screen 150 can be displayed by an operation such as tapping the contest icon 48 on the home screen 40.

By allowing many users to vote for the favorite flowerbeds on the flowerbed contest screen 150, it is possible to select the flowerbed image considered to be preferred in general. Such flowerbed contest may be held for a prescribed period or may be held constantly. Further, separate flowerbed contest may be held for a plurality of themes.

On the flowerbed contest screen 150, displayed are flowerbed images 151*a* to 151*c*, voting icons 152*a* to 152*c*, favorite registering icons 153*a* to 153*c*, flowerbed switching icon 154, and an interim ranking icon 155.

The flowerbed images 151*a* to 151*c* are images of the flowerbeds as the subjects of voting in the flowerbed contest. Flowerbed images other than the flowerbed images 151*a* to 151*c* can be displayed by an operation such as tapping the flowerbed switching icon 154. The flowerbed images used for the flowerbed contest may be posted by the users or may be registered by the administrator of the system.

The user can vote for the flowerbed images 151*a* to 151*c* by an operation such as tapping the voting icons 152*a* to 152*c*. For voting, it may be defined that a single user is allowed to cast a vote, allowed to cast a prescribed number of votes, or allowed to cast as many votes as the user desires.

The user can save the flowerbed images 151*a* to 151*c* in the favorites by an operation such as tapping the favorite registering icons 153*a* to 153*c*. The flowerbed image saved in the favorites can be displayed by an operation such as tapping the favorite icon 41 on the home screen 40, for example.

The user can view the interim result of the flowerbed contest by an operation such as tapping the interim ranking icon 155. While there is no specific limit set for a display mode of the interim result, it is possible to display the flowerbed images, the ranking, and the number of votes, for example.

Figure 16:
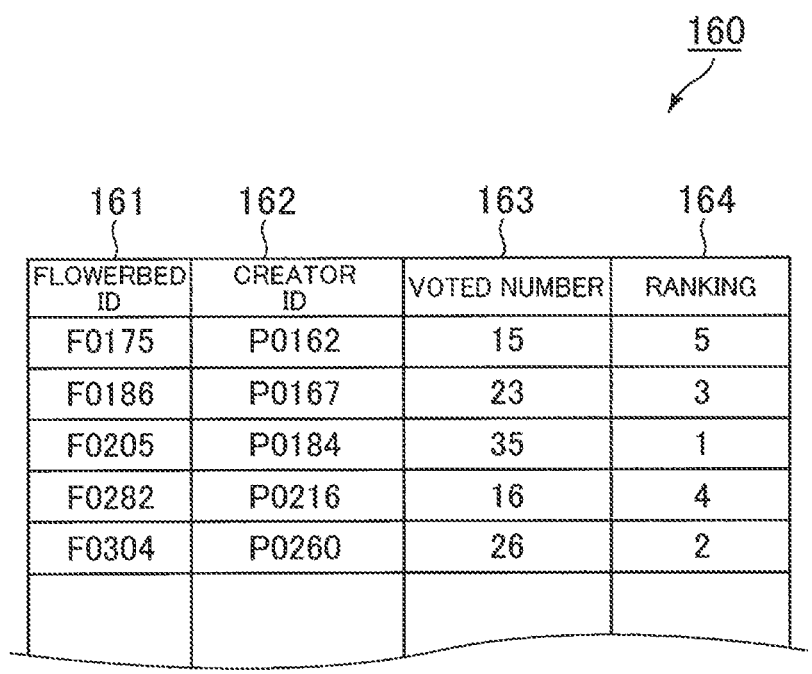
FIG. 16 is a table showing an example of a flowerbed contest table according to the embodiment of the present invention.

FIG. 16 is a table showing an example of a flowerbed contest table according to the embodiment of the present invention. Voting data acquired by casting votes by operations such as tapping the voting icons 152*a* to 152*c* is stored in a flowerbed contest table 160 as shown in FIG. 16.

In the flowerbed contest table 160, flowerbed ID 161, creator ID 162, voted number 163, ranking 164, and the like are stored by being associated with each other. The voted number 163 is increased as appropriate every time there is a vote casted by the users, and the ranking 164 changes in accordance with the increase in the voted number. It is preferable to employ a mode with which the flowerbed images with a greater number of votes or the flowerbed images of higher ranking are recommended and displayed for many users.

Store Statistics of User Attribute

The flowerbed sales order system according to the embodiment is preferable to include: an attribute storage that stores the attribute of the user and the attributes of other users; and a statistics acquirer that acquires statistics of the attributes, in which the flowerbed information storage is preferable to store the information regarding the flowerbed in association with the attribute, and the flowerbed recommendation displayer is preferable to recommend and display the flowerbed based on the acquired statistics. With such configuration, it is possible to recommend the flowerbed which is highly probable to be preferred by the user having a certain attribute.

The user attribute may be registered by the user when the user starts up the application for the first time or may be inputted at any time. While there is no specific limit set for the items of the attribute to be registered by the user, examples thereof may be gender, birthdate, residence area, birthplace, annual income, and occupation.

FIG. 17 is a table showing an example of an attribute table according to the embodiment of the present invention. In an attribute table 170, stored by being associated with user ID 171 are gender 172, age 173, residence area 174, birthplace 175, annual income 176, occupation 177, and the like. Further, when the user orders a flowerbed, a flowerbed image ID 178 as the information regarding the flowerbed is stored by being associated with the information described above.

FIG. 18 is a table showing an example of a statistics table according to the embodiment of the present invention. A statistics table 180 is automatically generated based on the information stored in the attribute table 170 described above. In the statistics table 180, attribute item 188 and highly relevant information 189 are stored by being associated with attributes 187 such as gender 181, age 182, residence area 183, birthplace 184, annual income 185, and occupation 186.

The attribute items 188 are the items the user registers regarding the attributes 187. For example, as the residence area 183, there are attribute items such as "Hokkaido", "Tohoku", and "Kanto". As the highly relevant information 189, a plurality of kinds of information can be stored in a descending order from the highest relevancy such as the 1st highest and 2nd highest. The highly relevant information 189 is stored as the order items regarding the order history of the past and the order information corresponding thereto. For example, it is stored in the statistics table 180 as the statistics information that the user whose "age" is in one's "30s" statistically has a strong tendency to order a flowerbed whose "shape" is "rectangle", and also statistically has a tendency to order a plant whose "color" is "red".

As described, by identifying the flowerbed image highly relevant with the attributes from the statistics of the attributes of the other users and the images of the flowerbeds ordered by the other users and by recommending and displaying the identified flowerbed image to the user having the common attributes, the flowerbed image that is highly probable to be preferred by the user can be readily recommended and displayed.

Input of Evaluation of Flowerbed Image

Figure 19:
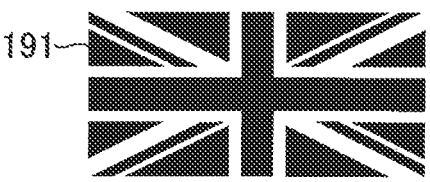
FIG. 19 is a view showing an example of a flowerbed evaluation input screen for inputting evaluation of the flowerbed according to the embodiment of the present invention.

FIG. 19 is a view showing an example of a flowerbed evaluation input screen for inputting evaluation of the flowerbed according to the embodiment of the present invention. On a flowerbed evaluation input screen 190, the preference of the user for the flowerbed can be stored in the flowerbed sales order system by having the user input the evaluation of the flowerbed.

On the flowerbed evaluation input screen 190 shown in FIG. 19, a flowerbed image 191, an evaluation item 192, evaluations 193a and 193b, evaluation values 194, an input section 195, a transition button 196, and the like are displayed. The flowerbed evaluation input screen 190 can be displayed on the display screen 13a.

The flowerbed image 191 is an image of the flowerbed as the subject of the evaluation carried out by the user. For the flowerbed image 191, an image of the flowerbed template made by the user may be used or an image of the flowerbed template made and stored by the administrator of the flowerbed sales order system may be used as well.

The preference for the flowerbed image 191 can be evaluated by a following SD method (Semantic Differential method). By using the SD method, the subjective preference of the user can be objectively inputted and stored.

The user evaluates the evaluation items 192 of the flowerbed image 191, such as "color" of the flowerbed, "shape", "pattern", and "the whole". The evaluation items 192 are further subdivided into specific evaluations 193a and 193b. The flowerbed evaluation input screen 190 displays the subjective image the user holds for the flowerbed image 191 as a pair of concepts such as "like"-"dislike", "loud"-"sober", or "novel"-"ordinary". For the pairs of concepts, the user can select the evaluation value 194 of four stages from "1" to "4". The evaluation value 194 can be selected by performing a prescribed operation such as tapping made on the input section 195.

In order to aptly grasp the preference of the user for the flowerbed, it is preferable to input the flowerbed evaluation for a plurality of flowerbed images 191. Therefore, it is preferable to display the transition button 196, and newly display a flowerbed image different from the flowerbed image 191 currently displayed when a prescribed operation such as tapping is made on the transition button 196. The user can input information regarding the flowerbed evaluation for the newly displayed flowerbed image. The information regarding the flowerbed evaluation inputted in the manner described above can be stored in the storage 33 of the server apparatus 3.

The flowerbed image to be recommended and displayed can be determined based on the stored information regarding the flowerbed evaluation. For example, regarding a prescribed flowerbed image 191, the controller 31 compares the information regarding the flowerbed evaluation inputted newly by a certain user with the information regarding the flowerbed evaluation inputted in the past by other users. By the comparison, the controller 31 identifies the other user exhibiting high similarity regarding the preference of the flowerbed. The controller 31 selects the flowerbed image that is ordered in the past or selected by the identified other user. By displaying the flowerbed image selected in the manner described above on the user terminal 1 of the user who has newly inputted the information regarding the flowerbed evaluation, the flowerbed image that fits the preference of the user can be recommended and displayed.

Processing for Updating Probability A of Recommendation Display

FIG. 20 is a table showing an example of a probability table A according to the embodiment of the present invention. In a probability table A 200, stored are user ID 201, flowerbed image ID 202, flowerbed description 203, group ID 204, group name 205, user selection point 206, user selection point modified value 207, user order point 208, user order point modified value 209, flowerbed total point A 210, user total point A 211, recommendation display probability A 212, and the like.

In the probability table A 200, all the flowerbed image IDs 202 stored in the storage 33 of the server apparatus 3 are associated with a single user ID 201. Further, the group ID 204 is associated with a plurality of flowerbed image IDs 202.

For example, the group ID "G0001" of the group name "national flag" is associated with the flowerbed image ID "F0001" of "Italian flag", the flowerbed image ID "F0002" of "French flag", and the flowerbed image ID "F0003" of "Union flag". Further, for example, the group ID "G0033" of the group name "red color group" is associated with the flowerbed image ID "F0003" of "Union flag" and the flowerbed image ID "F0005" of "sun".

The user selection point 206 shows the point that is given every time the user selects the flowerbed image by an operation such as tapping. For example, while the user selection point 206 of the flowerbed image the user has not selected even once is "0", "5" can be added as the user selection point 206 for the flowerbed image the user has selected once.

Further, for example, when the flowerbed of "crescent moon" whose flowerbed image ID is "F0004" is selected, "5" may be added as the user selection point of the flowerbed of "sun" of another flowerbed image ID "F0005" associated with "celestial body" of the group ID "G0002" because the "crescent moon" of the flowerbed image ID "F0004" is associated with the "celestial body" of the group ID "G0002".

The user selection point modified value 207 is a value acquired by dividing the user selection point 206 by the number of flowerbed images included in a group. For example, because the number of the flowerbed images included in the group "celestial body" whose group ID is "G0004" is "2", the value "2.5" that is the value acquired by dividing the user selection point "5" by the number of flowerbed images "2" is the user selection point modified value.

The user order point 208 is the point that is given every time the user orders the flowerbed. For example, while the user order point 208 for the image of the flowerbed the user has not order even once is "0", "10" can be added as the user order point 208 for the flowerbed image the use has ordered once.

Further, for example, when a flowerbed of "Italian flag" whose flowerbed image ID is "F0001" is ordered, "10" can be added as the user order point for the "French flag" of another flowerbed image ID "F0002" and "Union flag" of "F0003" associated with the "national flag" of the group ID "G0001" because the "Italian flag" whose flowerbed image ID is "F0001" is associated with the "national flag" whose group ID is "G0001".

The user order point modified value 209 is a value acquired by dividing the user order point 208 by the number of the flowerbed images included in a group. For example, because the number of the flowerbed images included in the group "national flag" whose group ID is "G0001" is "3", the value "3.3" that is the value acquired by dividing the user order point "10" by the number of flowerbed images "3" is the user order point modified value.

The flowerbed total point A 210 is the total of modified values of the points associated with each of the flowerbed image IDs 202. That is, the flowerbed total point A 210 is the total of the user selection point modified value 207 and the user order point modified value 209.

The user total point A 211 is the total of the flowerbed total points A 210. The recommendation display probability A 212 can be calculated by dividing each flowerbed total point A 210 by the user total point A 211.

The flowerbed images associated with the flowerbed image ID 202 are recommended and displayed based on the recommendation display probability A 212. By setting the recommendation display probability A 212, it becomes possible to recommend and display, with high frequency, the flowerbed highly probable to be preferred by the user based on the selection history and the order history of the user and also to prevent the same flowerbed from being recommended and displayed every time. Note that it is possible to employ a structure with which the image of the ordered flowerbed itself is not recommended and displayed irrespective of the recommendation display probability A 212.

FIG. 21 is a flowchart showing an example of a flowchart regarding processing for updating the recommendation display probability A of the flowerbed options according to the embodiment of the present invention.

First, it is determined whether or not to add the user selection point (step S41). When there is a user selection point that can be added (YES in step S41), the user selection point is added (step S42). When there is no user selection point that can be added (NO in step S41), it is shifted to next processing without adding the user selection point.

Subsequently, it is determined whether or not to add the user order point (step S43). When there is a user order point that can be added (YES in step S43), the user order point is added (step S44). When there is no user order point that can be added (NO in step S43), it is shifted to next processing without adding the user order point.

At last, the flowerbed total point A is divided by the user total point A to calculate the recommendation display probability A (step S45). The recommendation display probability A is updated by overwriting and saving the calculated recommendation display probability A as the recommendation display probability A 212 of the probability table A 200.

As described, the flowerbed sales order system according to the embodiment is preferable to include: a group storage that stores flowerbed options classified into groups; a recommendation probability storage that stores the probability of recommending and displaying the options for each option of the flowerbed; a selection acceptor that accepts selection of the options of the flowerbeds; and a recommendation probability increaser that increases, with a prescribed condition, the probability of recommending and displaying the options included in the group of the selected options after selection is accepted and before recommendation and display are to be done again. The configuration described above enables the flowerbed sales order system to learn the preference of the user so that more appropriate recommendation and display can readily be provided. Further, the more the update of the recommendation probability A is repeated, the more appropriate recommendation and display can readily be provided.

While there is no specific limit set for the mode for recommendation and display based on the recommendation probability A, it is possible to recommend and display the flowerbed image in the option display section 43 of the home screen 40, for example. There is no specific limit set for the order of the flowerbed images when recommending and displaying, it is preferable to employ a mode with which the flowerbed images are recommend and displayed in a descending order from the highest recommendation probability A and/or by each group.

Specifically, for example, it is possible to employ a mode with which the flowerbed images selected to be recommended and displayed are sorted into each group, the one with the highest recommendation probability A within each of the groups is identified, and the flowerbed images are recommended and displayed in order from the group including the one with the highest recommendation probability A. Further, it is also possible to employ a mode with which the flowerbed images selected to be recommended and displayed are sorted into each group, the average value of the recommendation probability A within each of the groups is calculated and identified, and the flowerbed images are recommended and displayed in order from the group having the highest average value.

Processing for Updating Probability B of Recommendation Display

FIG. 22 is a table showing an example of a probability table B according to the embodiment of the present invention. In a probability table B 220, stored are user ID 221, flowerbed image ID 222, flowerbed description 223, attribute statistics point 224, frequent word point 225, voting evaluation point 226, flowerbed total point B 227, user total point B 228, recommendation display probability B 229, and the like.

In the probability table B 220, all the flowerbed image IDs 222 stored in the storage 33 of the server apparatus 3 are associated with a single user ID 221.

The attribute statistics point 224 is the point that is given based on the attribute statistics information. For example, in a case where the user's "age" is in one's "30s", and the user whose "age" is in one's "30s" statistically has a strong tendency to order a flowerbed whose "shape" is "rectangle" and also statistically has a tendency to order a plant whose "color" is "red", it is possible to give "2" to the flowerbed image whose "shape" is "rectangle" and give "1" to the flowerbed image whose "color" is "red", for example, as the attribute statistics point 224.

The frequent word point 225 is the point that is given based on the frequent words. For example, in a case where there is "crescent moon" as the frequent word on the website specified by the user and a certain flowerbed image is associated with the frequent word "crescent moon", it is possible to give the frequent word point 225 to such flowerbed image. Further, it is possible to give the points in a descending order such as "3", "2", and "1" from the frequent word of the highest frequency.

The voting evaluation point 226 is the point that is given based on the number of votes in a flowerbed contest. For example, when the number of votes for a certain flowerbed image is "1", it is possible to give "1" as the voting evaluation point 226 for that flowerbed image.

The flowerbed total point B 227 is the total of the points associated with each of the flowerbed image IDs 222. That is, the flowerbed total point B 227 is the total of the attribute statistics point 224, the frequent word point 225, and the voting evaluation point 226.

The user total point B 228 is the total of the flowerbed total points B 227. The recommendation display probability B 229 can be calculated by dividing each flowerbed total point B 227 by the user total point B 228.

The flowerbed images associated with the flowerbed image ID 222 are recommended and displayed based on the recommendation display probability B 229. By setting the recommendation display probability B 229, it becomes possible to recommend and display, with high frequency, the flowerbed highly probable to be preferred by the user based on the attribute of the user, the frequent words, the voting evaluation of the user, and the like, and also to prevent the same flowerbed from being recommended and displayed every time.

Figure 23:
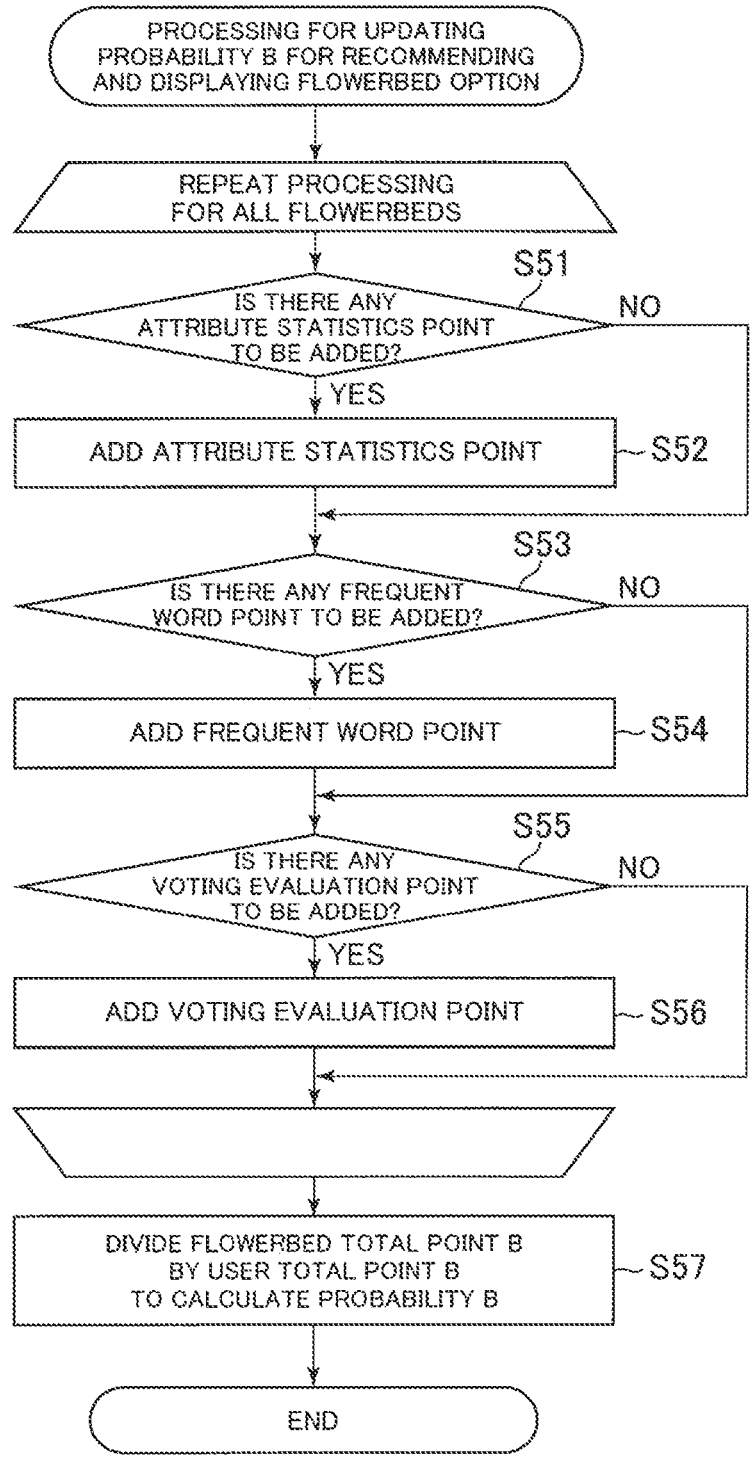
FIG. 23 is a flowchart showing an example of a flowchart regarding processing for updating the recommendation display probability B of the flowerbed options according to the embodiment of the present invention.

FIG. 23 is a flowchart showing an example of a flowchart regarding processing for updating the recommendation display probability B of the flowerbed options according to the embodiment of the present invention.

First, it is determined whether or not to add the attribute statistics point (step S51). When there is an attribution statistics point that can be added (YES in step S51), the attribution statistics point is added (step S52). When there is no attribution statistics point that can be added (NO in step S51), it is shifted to next processing without adding the attribution statistics point.

Subsequently, it is determined whether or not to add the frequent word point (step S53). When there is a frequent word point that can be added (YES in step S53), the frequent word point is added (step S54). When there is no frequent word point that can be added (NO in step S53), it is shifted to next processing without adding the frequent word point.

Then, it is determined whether or not to add the voting evaluation point (step S55). When there is a voting evaluation point that can be added (YES in step S55), the voting evaluation point is added (step S56). When there is no voting evaluation point that can be added (NO in step S55), it is shifted to next processing without adding the voting evaluation point.

At last, the flowerbed total point B is divided by the user total point B to calculate the recommendation display probability B (step S57). The recommendation display probability B is updated by overwriting and saving the calculated recommendation display probability B as the recommendation display probability B 229 of the probability table B 220.

By repeating the processing for updating the probability B for recommending and displaying the flowerbed options in the manner described above, the flowerbed sales order system can learn the preference of the user so that more appropriate recommendation and display can readily be provided. Further, the more the update of the recommendation probability B is repeated, the more appropriate recommendation and display can readily be provided.

While there is no specific limit set for the mode for recommendation and display based on the recommendation probability B, it is possible to be displayed in the option display section 43 of the home screen 40, for example. In this case, it is preferable to employ a configuration that includes means for determining, with a prescribed condition, whether to display the flowerbed image displayed in the option display section 43 of the home screen 40 based on the recommendation probability A or based on the recommendation probability B. It is possible to use a prescribed probability set in advance as the prescribed condition or it is possible to define the prescribed condition as being relevant to the displayed screen or the operated content before the user displays the flowerbed options. Furthermore, it is also possible to provide a display section on a screen different from the home screen 40 for providing recommendation and display based on the recommendation probability B.

While there is no specific limit set for the order for recommending and displaying the flowerbed images, it is preferable to employ a mode with which the flowerbed images are recommended and displayed in a descending order from the highest recommendation probability B. Further, it is also possible to use the groups used when calculating the recommendation probability A also for determining the order for making it possible to provide recommendation and display by each group.

Specifically, for example, it is possible to employ a mode with which the flowerbed images selected to be recommended and displayed are sorted into each group, the one with the highest recommendation probability B within each of the groups is identified, and the flowerbed images are recommended and displayed in order from the group including the one with the highest recommendation probability B. Further, it is also possible to employ a mode with which the flowerbed images selected to be recommended and displayed are sorted into each group, the average value of the recommendation probability B within each of the groups is calculated and identified, and the flowerbed images are recommended and displayed in order from the group having the highest average value.

Processing for Intentionally Recommending and Displaying Flowerbed Image Different from Preference of User In the flowerbed sales order system according to the embodiment, the flowerbed recommendation displayer is preferable to include means for recommending and displaying a flowerbed that is different from the flowerbeds selected based on one condition or more selected from a group of the order history of the user, frequent words of a prescribed website, evaluations of other users, and attribute of the user. With such configuration, it is possible to intentionally recommend and display the flowerbed that is different from the preference of the user. Therefore, the user can easily discover the types of flowerbeds that are different from the preference and tastes thereof as of that moment.

Specifically, by employing a mode with which the flowerbed image having the low recommendation display probability A 212 and/or the low recommendation display probability B 229 is preferentially recommended and displayed, it is possible to intentionally recommend and display the flowerbed that is different from the preference of the user as described above. For example, when the recommendation display probability A or the recommendation display probability B is "0.2", "0.8" that is the value acquired by subtracting the recommendation display probability "0.2" from the probability "1" can be taken as the probability for intentionally recommending and displaying the flowerbed that is different from the preference of the user.

Processing for Making Flowerbed from Scratch

FIG. 24 is a flowchart showing an example of a flowchart regarding processing for making a flowerbed from scratch and placing and receiving an order thereof according to the embodiment of the present invention. For example, by an operation such as tapping the flowerbed designing icon 47 shown in FIG. 4, it is possible to start the flowerbed sales order processing by displaying a screen for designing a flowerbed from scratch without using the recommended and displayed flowerbed images.

When the flowerbed sales order processing is started, first, an input screen for inputting information regarding the shape and area of the flowerbed desired by the user is displayed on the display screen 13*a*, and the shape and the area of the flowerbed are determined by an operation such as tapping the input screen (step S61). Determination of the shape and area of the flowerbed can be done on the shape-and-the-like modification screen 50.

When the shape and the area of the flowerbed are determined in step S61, an input screen for inputting colors of each of the regions configuring the shape of the flowerbed is then displayed on the display screen 13*a*, and the colors of each of the regions configuring the shape of the flowerbed are determined by an operation such as tapping made on the input screen (step S62). Determination of the colors of the plants can be done on the color modification screen 60.

When the colors of each of the regions configuring the flowerbed are determined in step S62, an input screen for inputting kinds of plants to be planted in each of the regions is then displayed on the display screen 13*a*, and the kinds of the plants to be planted in each of the regions configuring the shape of the flowerbed are determined by an operation such as tapping made on the input screen (step S63). Determination of the kinds of the plants can be done on the plant modification screen 70.

When the colors and kinds of the plants are identified for each of a plurality of constituent regions by the processing from step S61 to S63, the fee for making the flowerbed according to a planting plan is calculated (step S64). For example, a fee per unit area or per region is defined for each plant or for each color of the plant, and a total fee required for making the flowerbed is calculated according to the plants selected in the planting plan. The calculated fee is displayed on the display screen 13*a* (step S65).

When the layout of the plants of different colors and/or different kinds is identified for each of a plurality of regions configuring the flowerbed, an image showing the state of the flowerbed is drawn and displayed on the display screen 13*a* (step S66).

When the user gives a viewpoint change instruction and/or a timing change instruction (YES in step S67), an image showing the state of the flowerbed is drawn and displayed on the display screen 13*a* according to the change instruction of the user (step S66). The viewpoint change instruction and/or the timing change instruction can be given on the viewpoint-and-the-like input screen 90.

When the user is satisfied with the image showing the state of the flowerbed displayed on the display screen 13*a* in step S66, it is possible to do provisional registration such as adding the planting-planned flowerbed to the so-called "shopping cart" by giving an operation instruction of the user terminal 1 (step S68) without giving the viewpoint change instruction and/or timing change instruction (NO in step S67). The user can successively make a planting plan for another flowerbed. By repeating the processing from S61 to S68, it is possible to make planting plans for a plurality of flowerbeds and add those flowerbeds to the shopping cart, and to perform a procedure for collectively purchasing those.

When the planting-planned flowerbeds are provisionally registered in step S68, an order placement button for confirming an order is displayed on the display screen 13*a* of the user terminal 1. Further, the cost when an order is placed for the flowerbeds added to the shopping cart is also displayed on the display screen 13*a*. As the cost, costs for individual flowerbeds added to the shopping cart as well as the total cost of a plurality of flowerbeds added to the shopping cart are displayed. The user can cancel a part of the flowerbeds added to the shopping cart or redo a part of the planting plans of the flowerbeds added to the shopping cart after checking the total cost required when placing the order for the flowerbeds. When a part of the planning plans of the flowerbeds added to the shopping cart is to be revised, the processing from step S61 to S68 is performed again for the flowerbed to be revised.

When the order placement button is tapped according to the operation instruction of the user, the order placement request is transmitted to the server apparatus 3 (step S69). In this case, all the flowerbeds added to the shopping cart and provisionally registered are the subjects of the order placement request. While the user can place the order for delivering and making the flowerbeds based on the planting plans made by the user, it is also possible to place orders for seeds, seedlings, and the like necessary for making the flowerbeds. It is also possible to allow the user to select whether to place the order for delivering and making the flowerbeds or to place the order only for delivering seeds, seedlings, and the like of the plants.

When the order placement request of the user is transmitted to the server apparatus 3 in step S69, the order content is received in the server apparatus 3 and the order content is stored in the storage 33 of the server apparatus 3, thereby confirming the order reception (step S70). The administrator of the flowerbed sales order system according to the present invention prepares seeds and seedlings of the ordered plants or makes the flowerbeds according to the content of the placed order, and delivers those to the address of the user registered in advance.

While the embodiment achieved by the system including the user terminal and the server apparatus is shown in the modes described above, the present invention can also be achieved by an embodiment using only the user terminal. In the embodiment using only the user terminal, the functions carried out by the server apparatus in the modes described above are achieved by the user terminal.

REFERENCE SIGNS LIST

1 USER TERMINAL
11 CONTROLLER
12 RAM
13 DISPLAY UNIT
14 STORAGE
15 SENSOR UNIT
16 COMMUNICATION INTERFACE
2 COMMUNICATION NETWORK
3 SERVER APPARATUS
31 CONTROLLER
32 RAM
33 STORAGE
34 COMMUNICATION INTERFACE
40 HOME SCREEN
50 SHAPE-AND-THE-LIKE MODIFICATION SCREEN
60 COLOR MODIFICATION SCREEN
70 PLANT MODIFICATION SCREEN
80 PLANT DATA TABLE
90 VIEWPOINT-AND-THE-LIKE INPUT SCREEN
100 ORDER HISTORY TABLE
120 RECOMMENDED FLOWERBED TEMPLATE TABLE
140 FREQUENT WORD TABLE
150 FLOWERBED CONTEST SCREEN
160 FLOWERBED CONTEST TABLE
170 ATTRIBUTE TABLE
180 STATISTICS TABLE
200 PROBABILITY TABLE A
220 PROBABILITY TABLE B

What is claimed is:

1. A flowerbed system comprising:
a user terminal; and
a server apparatus configured to communicate with the user terminal;
wherein the server apparatus includes
a flowerbed image storage that stores in association with each other a flowerbed image and a display probability that the flowerbed image will be displayed on the user terminal; and
a flowerbed image transmitter configured to transmit the flowerbed image stored in the flowerbed image storage to the user terminal according to a request from the user terminal for displaying a flowerbed,
wherein the user terminal includes
a flowerbed image displayer that displays the flowerbed image transmitted from the server apparatus on a predetermined area of a display of the user terminal based on the stored display probability;
a modification inputter that accepts an input to modify the flowerbed image displayed by the flowerbed image displayer by causing the flowerbed image displayer to
display a home screen displaying an option display section displaying flowerbed options showing different flowerbed shapes selectable by the user,
display a shape modification screen in response to user selection of one of the flowerbed options, the shape modification screen displaying
a flowerbed shape input section displaying a grid of a plurality of identical squares and configured to modify the shape of the selected flowerbed option on the home screen in response to the user selecting a plurality of the squares,
the selected plurality of the squares being displayed differently than squares not selected by the user, and
the user terminal accepting an input to modify the shape of the selected flowerbed option to be the shape created by the selected plurality of the squares,
a user-operated selection button for confirming the information inputted to the flowerbed shape input section,
a modified flowerbed image displayer that displays the modified flowerbed option modified by the flowerbed shape input section; and
a flowerbed request transmitter that transmits a request for a flowerbed corresponding to the displayed flowerbed image displayed by the flowerbed image displayer or the displayed and modified flowerbed option displayed by the modified flowerbed image displayer to the server apparatus.

2. The flowerbed system according to claim 1, wherein the server apparatus further includes
a flowerbed request history storage that stores the request of the flowerbed made by the user terminal as a request history; and
a probability changer that changes the display probability stored in association with the flowerbed image,
wherein the probability changer changes the display probability based on the request history.

3. The flowerbed system according to claim 1, wherein the server apparatus further includes
a frequent word identifier that identifies a frequent word on a predetermined website; and
a probability changer that changes the display probability, stored in association with the flowerbed image, based on the identified frequent word.

4. The flowerbed system according to claim 3, wherein the user terminal further includes a website specifier that enables the user to specify the predetermined website,
wherein the frequent word identifier identifies the frequent word on the specified, predetermined website.

5. The flowerbed system according to claim 1, wherein the server apparatus further includes
an evaluation storage that stores evaluations of other users of the flowerbeds; and
a probability changer that changes the display probability, stored in association with the flowerbed image, based on the evaluations of the other users stored in the evaluation storage.

6. The flowerbed system according to claim 1, wherein the server apparatus further includes
an attribute storage that stores an attribute of the user and attributes of other users;
a statistics acquirer that acquires statistics regarding the attributes; and
a probability changer that changes the display probability, stored in association with the flowerbed image, based on the acquired statistics.

7. The flowerbed system according to claim 1,
wherein the server apparatus further includes
a group storage that stores flowerbed images classified into groups; and
a probability changer that changes the display probability stored in association with the flowerbed image,
wherein the user terminal further includes a selection acceptor that accepts selection of the flowerbed image, and
wherein the probability changer increases the display probability stored in association with the flowerbed images that are included in the group of the selected flowerbed image based on accepting the selection of the flowerbed image.

8. The flowerbed system according to claim 1,
wherein the system is operable in a mode in which the flowerbed image displayer displays a flowerbed image on the predetermined area of the display of the user terminal associated with a low display probability, lower than the display probability stored in association with the flowerbed image.

9. The flowerbed system according to claim 1, wherein the home screen also displays
option switching icons, which when selected by the user display additional flowerbed options,
a display list icon, which when selected by the user, causes the flowerbed image displayer to display a list of additional flowerbed options other than the flowerbed options displayed in the option display section of the home screen, and
a flowerbed designing icon, which when selected by the user causes the flowerbed image displayer to display a screen for designing a flowerbed from scratch without using the displayed flowerbed options.

10. A user terminal capable of communicating with a server apparatus comprising:
a flowerbed request transmitter configured to transmit a request to the server apparatus for the server apparatus to transmit to the user terminal a flowerbed image for display by the user terminal;
a flowerbed image displayer configured to display the flowerbed image, transmitted from the server apparatus in response to the request, on a predetermined area of a display of the user terminal based on a stored display probability that the flowerbed image will be displayed on the user terminal and that is stored in association with the flowerbed image by the server apparatus;
a modification inputter configured to accept an input to modify the flowerbed image displayed by the flowerbed image displayer; and
a modified flowerbed image displayer configured to display the modified flowerbed image by causing the flowerbed image displayer to
display a home screen displaying an option display section displaying flowerbed options showing different flowerbed shapes selectable by the user,
display a shape modification screen in response to user selection of one of the flowerbed options, the shape modification screen displaying
a flowerbed shape input section displaying a grid of a plurality of identical squares and configured to modify the shape of the selected flowerbed option on the home screen in response to the user selecting a plurality of the squares,
the selected plurality of the squares being displayed differently than squares not selected by the user, and
the user terminal accepting an input to modify the shape of the selected flowerbed option to be the shape created by the selected plurality of the squares,
a user-operated selection button for confirming the information inputted to the flowerbed shape input section,
a modified flowerbed image displayer that displays the modified flowerbed option modified by the flowerbed shape input section; and
wherein the flowerbed request transmitter is also configured to transmit to the server apparatus a request for a flowerbed corresponding to the displayed flowerbed image displayed by the user terminal or the displayed and modified flowerbed option displayed by the user terminal.

11. A method comprising:
transmitting from a user terminal to a server apparatus a request for displaying a flowerbed image;
storing with a flowerbed image storage of the server apparatus, in association with each other, the flowerbed image and a display probability that the flowerbed image will be displayed on the user terminal;
transmitting from the server apparatus to the user terminal the flowerbed image stored in the flowerbed image storage according to the request from the user terminal for displaying the flowerbed image;
displaying with a flowerbed image displayer of the user terminal the flowerbed image transmitted from the server apparatus on a predetermined area of a display of the user terminal based on the stored display probability;
accepting with a modification inputter of the user terminal an input to modify the flowerbed image displayed by the flowerbed image displayer by causing the flowerbed image displayer to
display a home screen displaying an option display section displaying flowerbed options showing different flowerbed shapes selectable by the user,
display a shape modification screen in response to user selection of one of the flowerbed options, the shape modification screen displaying
a flowerbed shape input section displaying a grid of a plurality of identical squares and configured to modify the shape of the selected flowerbed option on the home screen in response to the user selecting a plurality of the squares,
the selected plurality of the squares being displayed differently than squares not selected by the user, and
the user terminal accepting an input to modify the shape of the selected flowerbed option to be the shape created by the selected plurality of the squares,
a user-operated selection button for confirming the information inputted to the flowerbed shape input section;
displaying with a modified flowerbed image displayer of the user terminal a modified flowerbed option that includes the modifications accepted by the modification inputter; and
transmitting with a flowerbed request transmitter of the user terminal to the server apparatus a request for a flowerbed corresponding to the displayed flowerbed image displayed by the flowerbed image displayer or the displayed and modified flowerbed option displayed by the modified flowerbed image displayer.

\* \* \* \* \*